(12) United States Patent
Yotani et al.

(10) Patent No.: US 7,233,301 B2
(45) Date of Patent: Jun. 19, 2007

(54) FLAT PANEL DISPLAY AND METHOD OF MANUFACTURING THE SAME

(75) Inventors: Junko Yotani, Mie (JP); Sashiro Uemura, Mie (JP)

(73) Assignee: Noritake Co., Ltd., Aichi (JP)

( * ) Notice: Subject to any disclaimer, the term of this patent is extended or adjusted under 35 U.S.C. 154(b) by 567 days.

(21) Appl. No.: 10/682,640

(22) Filed: Oct. 8, 2003

(65) Prior Publication Data

US 2005/0104494 A1   May 19, 2005

(30) Foreign Application Priority Data

Oct. 9, 2002   (JP)   ............... 2002-296447
Dec. 13, 2002   (JP)   ............... 2002-361822

(51) Int. Cl.
G09G 3/20   (2006.01)
(52) U.S. Cl. .................................... 345/75.2
(58) Field of Classification Search .............. 345/74.1, 345/75.1, 75.2; 315/169.1, 169.3; 313/2.1, 313/495, 492, 485
See application file for complete search history.

(56) References Cited

U.S. PATENT DOCUMENTS 6,991,949 B2 *   1/2006   Muroyama et al. ........... 438/20

FOREIGN PATENT DOCUMENTS

| CN | 1238550 A | 12/1999 |
|---|---|---|
| JP | 02-299124 | 12/1990 |
| JP | 2002-203469 | * 7/1996 |
| JP | 11-162383 A | 6/1999 |
| JP | 2000-030640 | 1/2000 |
| JP | 2000-268704 | 9/2000 |
| JP | 2001-076652 | 3/2001 |
| JP | 2002-023688 | 1/2002 |
| JP | 2002-025477 | 1/2002 |
| JP | 2002-100282 | 4/2002 |
| JP | 2002-184301 | 6/2002 |
| JP | 08-185816 | * 7/2002 |
| JP | 2002-203469 | 7/2002 |

* cited by examiner

*Primary Examiner*—Kevin M. Nguyen
(74) *Attorney, Agent, or Firm*—Blakely Sokoloff Taylor & Zafman

(57) ABSTRACT

A flat panel display includes a vacuum envelope, a cathode, a gate electrode substrate, and a phosphor screen and anode electrode. The vacuum envelope includes a front glass plate which is at least partly transparent and a substrate opposing the front glass plate. The cathode is formed on the substrate and has an electron-emitting source. The gate electrode substrate has an electron-passing hole and is arranged in the vacuum envelope to oppose the substrate to be separate from the cathode. The phosphor screen and anode electrode are formed on a surface of the front glass plate in the vacuum envelope. The gate electrode substrate includes at least an insulating substrate and a gate electrode. The insulating substrate has the electron-passing hole. The gate electrode is formed on the insulating substrate. A method of manufacturing a flat panel display is also disclosed.

6 Claims, 15 Drawing Sheets

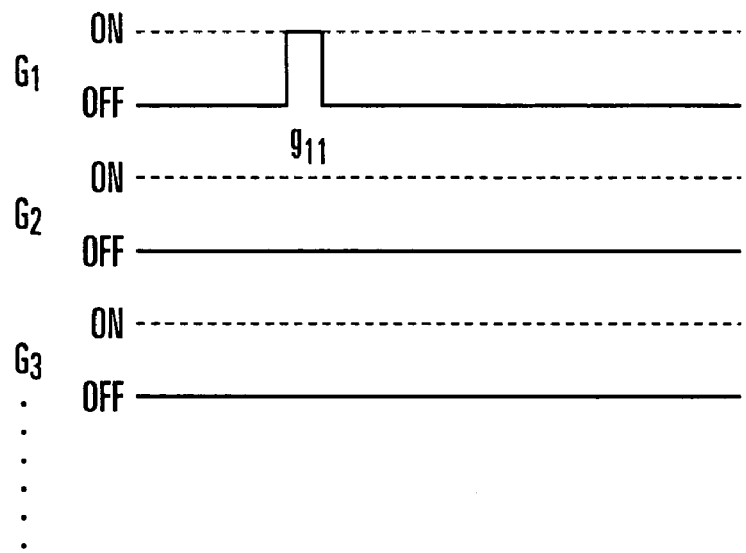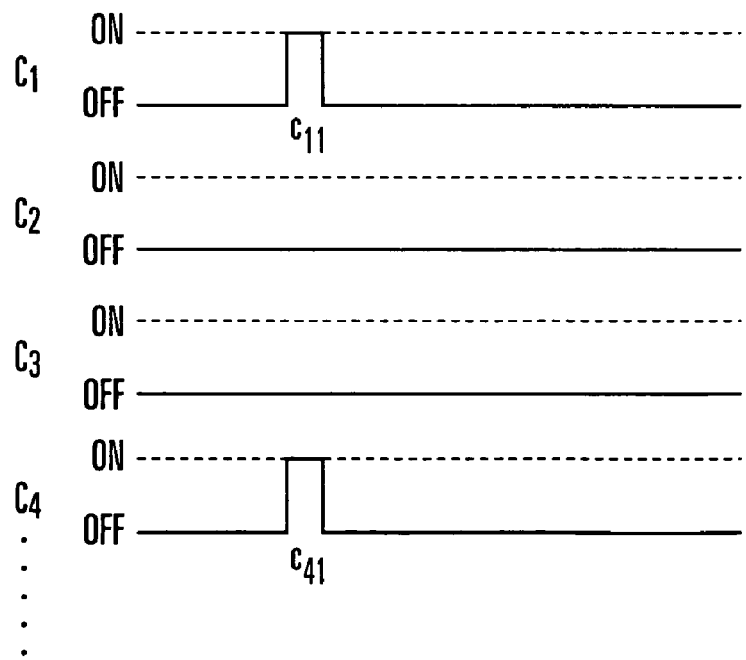

FLAT PANEL DISPLAY AND METHOD OF MANUFACTURING THE SAME

BACKGROUND OF THE INVENTION

The present invention relates to a flat panel display which emits light by causing electrons emitted from an electron-emitting source to bombard on a phosphor screen and, more particularly, to a flat panel display which uses nanotube fibers as an electron-emitting source.

In recent years, a flat panel display such as a field emission display (FED) or a field emission display which uses nanotube fibers, e.g., carbon nanotubes, as the electron-emitting source of a flat vacuum fluorescent display has been proposed and attracts attention.

A carbon nanotube is a material with a structure in which a single graphite layer is cylindrically closed and a five-membered ring is formed at the distal end of the cylinder. As the carbon nanotube is chemically stable, it is not easily influenced by a residual gas. The typical diameter of the carbon nanotube is as very small as 10 nm to 50 nm to provide a material having a high aspect ratio. Hence, the carbon nanotube has a high field-emission performance.

Regarding a flat panel display which uses the above carbon nanotube as the electron-emitting source, an example which uses an electron-emitting source obtained by fixing, to a cathode with a conductive adhesive, a needle-like graphite column which has a length of several μmm to several mm and is made of a group of carbon nanotubes, and an example which uses an electron-emitting source formed by printing by using a paste mixed with columnar graphite are available (e.g., see Japanese Patent Laid-Open No. 11-162383).

According to the characteristic feature of a flat panel display having carbon nanotubes as the electron-emitting source, it has low power consumption due to the high field emission efficiency and thus has high brightness.

The basic arrangement of the flat panel display will be described with reference to FIG. 17.

In the flat panel display, the screen is formed by arraying a plurality of pixels in a matrix. This display has a vacuum envelope with a front glass plate 108 which is at least partly transparent and a substrate 101 opposing the front glass plate 108, a cathode 102 formed on the substrate 101, an electron-emitting source 103 formed at a predetermined region of the cathode 102, a gate electrode 105 having an electron-passing hole and opposing the substrate 101 to be separate from the cathode 102, and a phosphor screen 107 and an anode electrode 106 formed on the surface of the front glass plate 108. An insulating substrate 104 is provided between the cathode 102 and gate electrode 105.

The operation of the flat panel display will be described.

A voltage is applied between the gate electrode 105 corresponding to the electron-emitting source 103 and the cathode 102 such that the gate electrode 105 has a positive potential. This potential difference concentrates the electric field at the electron-emitting source 103, so that electrons are emitted.

The emitted electrons are accelerated toward the anode electrode 106 by applying a voltage between the anode electrode 106 and cathode 102, and bombard on the phosphor screen 107. Thus, the phosphor screen 107 emits light. When the phosphor screen 107 is constituted by three portions corresponding to the three primary colors of light consisting of R (red), G (green), and B (blue), color display can be performed.

The conventional flat panel display, however, has the following problems.

When the flat panel display is driven, for example, while a voltage which is positive with respect to cathodes is constantly applied the anode electrode, the cathodes are sequentially scanned in a pulse-like manner. When a predetermined cathode is selected, a voltage which is positive with respect to the cathode is applied, in accordance with an image to be displayed, to a gate electrode corresponding to each pixel. In this driving circuit, the voltage to be applied to the gate electrodes must be high. Hence, when the voltage between the gate and cathode changes, the anode current changes, and consequently the display uniformity within the panel fluctuates. Also, as the voltage to be applied to the gate electrode is high, the power consumption also increases.

An electron-emitting source provided to each cathode is formed by forming, on the surface of a cathode substrate, a film of a paste including, e.g., carbon nanotubes by printing such as screen printing, or thermal CVD. The surface of the electron-emitting source formed by, e.g., screen printing, is brought in contact with the gate electrode substrate. Accordingly, during alignment, the surface of the electron-emitting source rubs against the lower surface of the gate electrode surface, and is accordingly damaged. When carbon nanotubes form a film by thermal CVD, the film is brought into contact with the gate electrode substrate in the same manner as in the case wherein the film is formed by printing. Hence, the surfaces of the carbon nanotubes constituting the electron-emitting source are damaged. As a result, the display uniformity within the panel fluctuates.

A stray capacitance is formed between the cathode and the gate electrode substrate. When the intersecting area of the space sandwiched by the cathode and gate electrode is large, the stray capacitance increases, and the load capacitance occurring when the flat panel display is driven increases. The response speed decreases, and consequently the display uniformity within the panel fluctuates.

SUMMARY OF THE INVENTION

It is an object of the present invention to provide a flat panel display which can display uniformly.

It is another object of the present invention to provide a flat panel display in which a voltage to be applied to the gate electrode can be decreased.

It is still another object of the present invention to provide a flat panel display which has high reliability and high driving speed.

In order to achieve the above objects, according to the present invention, there is provided a flat panel display comprising a vacuum envelope comprising a front glass plate which is at least partly transparent and a substrate opposing the front glass plate, a cathode formed on the substrate and having an electron-emitting source, a gate electrode substrate having an electron-passing hole and arranged in the vacuum envelope to oppose the substrate to be separate from the cathode, and a phosphor screen and anode electrode which are formed on a surface of the front glass plate in the vacuum envelope, wherein the gate electrode substrate comprises at least an insulating substrate having the electron-passing hole, and a gate electrode formed on the insulating substrate.

BRIEF DESCRIPTION OF THE DRAWINGS

FIGS. 5A to 5C are driving timing charts for a vertical scanning circuit in the flat panel display according to the first embodiment;

FIGS. 6A to 6D are driving timing charts for a horizontal scanning circuit in the flat panel display according to the first embodiment;

DESCRIPTION OF THE PREFERRED EMBODIMENTS

Figure 1:
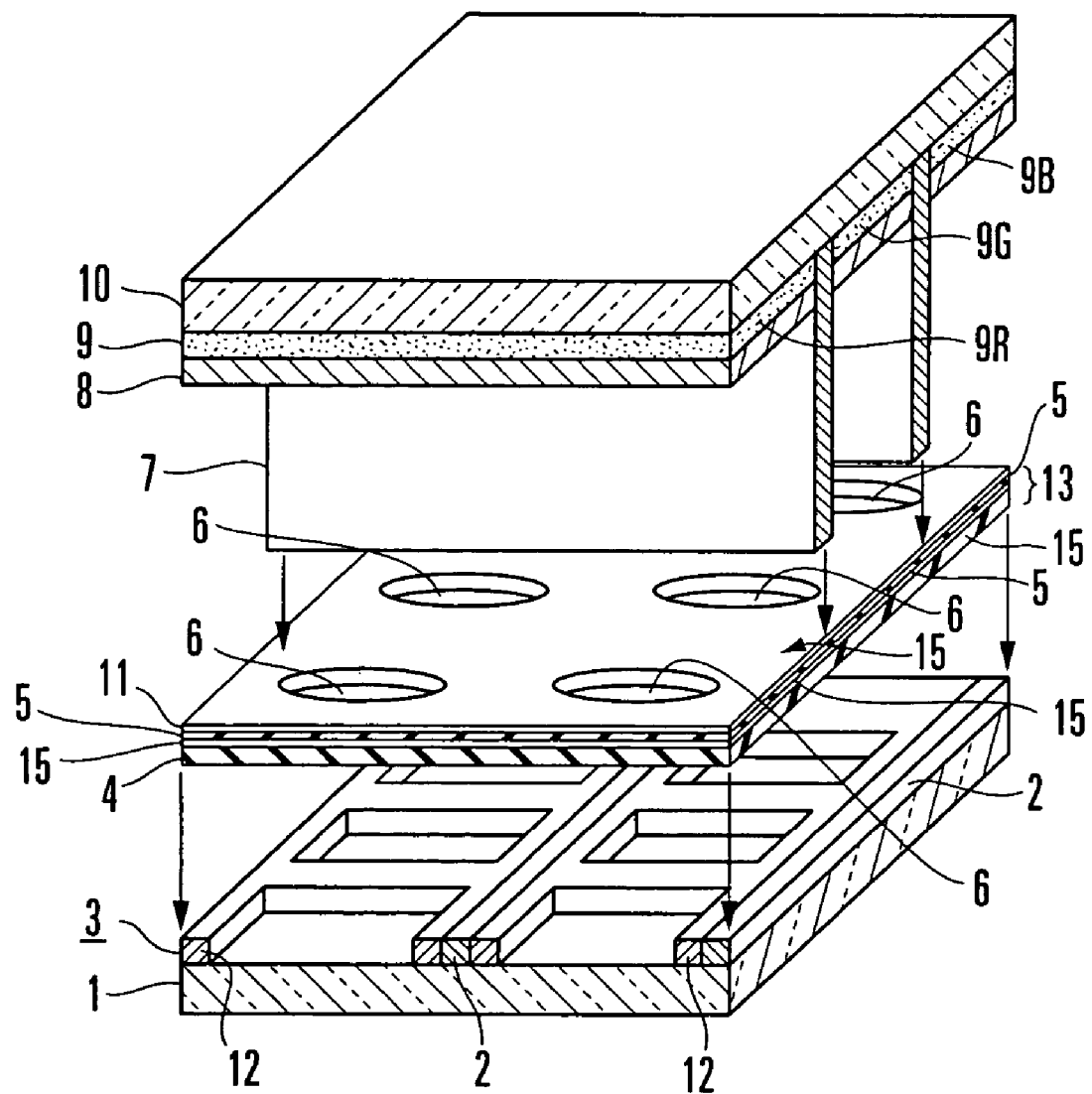
FIG. 1 is a schematic view for explaining the arrangement of a flat panel display according to the first embodiment.

The embodiments of the present invention will be described with reference to the accompanying drawings.

In all the drawings for explaining the embodiments, the portions having the same functions are denoted by the same reference numerals, and a repetitive explanation thereof will be omitted.

First Embodiment

As shown in FIG. 1, a flat panel display according to the first embodiment has a vacuum envelope with a front glass plate 10 which is at least partly transparent and a glass substrate 1 opposing the front glass plate 10 and having a substantially rectangular shape when seen from the top, and a cathode 3 formed on the glass substrate 1 and having electron-emitting sources in its predetermined region.

The flat panel display also has a gate electrode substrate 13 having electron-passing holes 6 and arranged in the envelope to oppose the glass substrate 1 to be separate from the cathode 3, and a phosphor screen 9 and anode electrode 8 which are formed on the surface of the front glass plate 10 in the vacuum envelope.

The cathode 3 has a plurality of band-like cathodes 12 which are arranged parallel to each other. The band-like cathodes 12 form electron-emitting sources 14. Substrate ribs 2 are arranged between the plurality of band-like cathodes 12.

The substrate ribs 2 are formed with a height equal to or less than those of the band-like cathodes 12. The substrate ribs 2 prevent electric discharge between the band-like cathodes 12.

To form the electron-emitting sources 14, a conductive material is filled in openings formed in the band-like cathodes 12 to form conductive films, and a large number of nanotube fibers are formed to expose from the conductive films. Alternatively, no openings may be formed in the band-like cathodes 12, but a conductive material may be filled on the band-like cathodes 12 to form a conductive film, and a large number of nanotube fibers may be formed to expose from the conductive film.

Each nanotube fiber is a material made of carbon and having a thickness of about 1 nm or more to less than 1 μm and a length of about 1 μm or more to less than 100 μm, and is formed of, e.g., a carbon nanotube.

Examples of the carbon nanotubes include one having a single-layer structure, and one having a coaxial multilayered structure in which a plurality of graphite layers form a telescopic layered structure with the respective graphite layers being closed cylindrically. Either structure can be employed.

Alternatively, a hollow graphite tube having an irregular defective structure or a graphite tube filled with carbon may be used. A structure in which a single-layer carbon nanotube as described above and a carbon nanotube having a coaxial multilayered structure are mixed may be used.

Figure 2A:
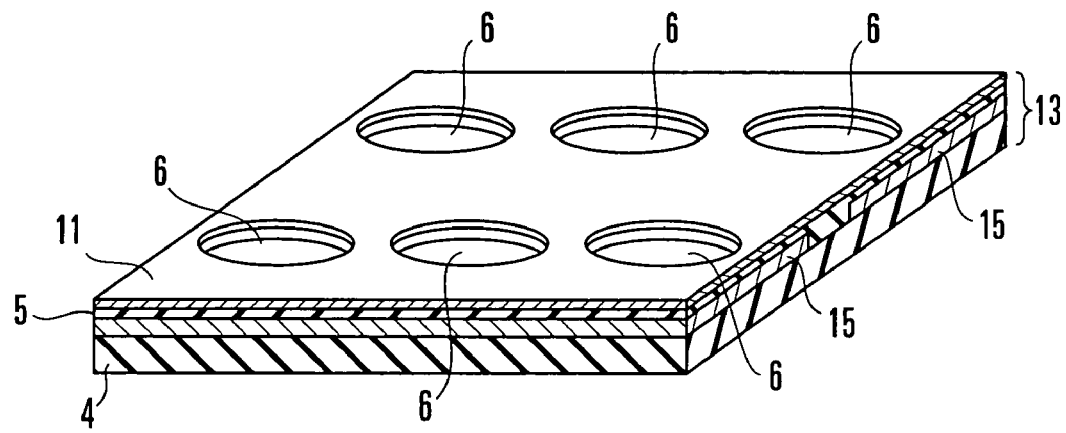
FIG. 2A is a schematic view for explaining a gate electrode substrate.
Figure 2B:
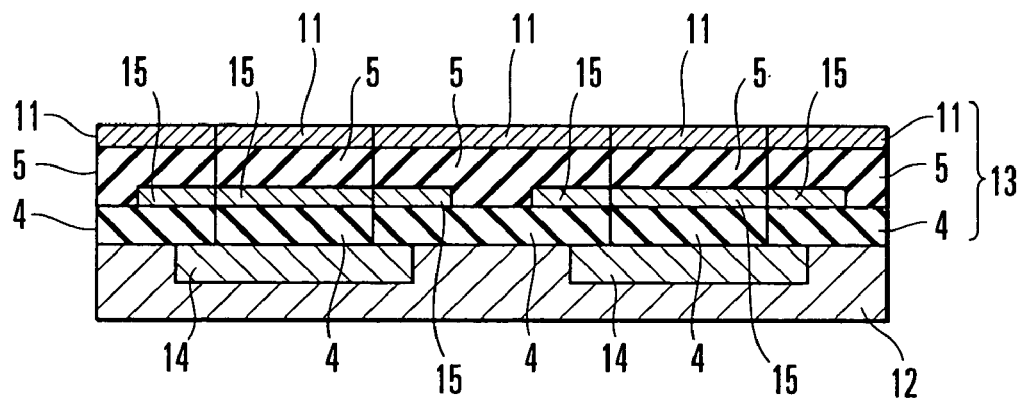
FIG. 2B is a schematic sectional view for explaining the gate electrode substrates and a cathode.

As shown in FIGS. 2A and 2B, the gate electrode substrate 13 has an insulating substrate 4, gate electrodes 15 formed on the insulating substrate 4, an insulating layer 5 formed on the gate electrodes 15, and a field control electrode 11 formed on the insulating layer 5 to apply a voltage between the insulating layer 5 and band-like cathodes 12.

The gate electrode substrate 13 has through holes (electron-passing holes 6) in regions intersecting the electron-emitting sources 14 formed in the band-like cathodes 12. Electrons emitted from the electron-emitting sources 14 pass through the electron-passing holes 6 and are accelerated toward the anode electrode 8.

The gate electrodes 15 are arranged, in a number corresponding to the number of rows of the pixels of the flat panel display, on the insulating substrate 4 to form bands in a direction perpendicular to the band-like cathodes 12 such that they are substantially parallel to each other. When necessary, spaces may be formed among the arranged gate electrodes 15.

The bombardment region of the electrons bombarding on the phosphor screen 9 changes depending on the thickness of the insulating layer 5. The larger the thickness of the insulating layer 5, the narrower the bombardment region of the electrons, and the electrons are focused accordingly. For example, in the first embodiment, the thickness of the insulating layer 5 is set to several ten μm to several hundred μm, so that the region in the phosphor screen 9 for the electrons emitted from the electron-emitting sources 14 is narrowed to focus the electrons.

The field control electrode 11 is formed to cover the entire surface of the insulating layer 5. With the presence of the field control electrode 11, the gate electrodes 15 and the cathode 3 having the electron-emitting sources 14 made of carbon nanotubes can be shielded. At the region where the field control electrode 11 is formed, no electric field is generated by the potential difference between the cathode 3 and anode electrode 8. Thus, damage caused by field concentration to the electron-emitting sources 14 can be prevented.

Front ribs 7 are formed between the front glass plate 10 and gate electrode substrate 13. The front glass plate 10 has a substantially rectangular shape when seen from the top, and is obtained by working low-alkali soda glass into a glass plate having a thickness of about 1 mm to 2 mm.

The front ribs 7 are made of, e.g., an insulating paste containing low-melting frit glass, and hang between the front glass plate 10 and gate electrode substrate 13 in a direction perpendicular to the substrate ribs 2 at a predetermined interval.

The phosphor screen 9, e.g., a red-emitting phosphor screen 9R, green-emitting phosphor screen 9G, and blue-emitting phosphor screen 9B, is arranged on the front glass plate 10 in a region between the front ribs 7. The anode electrode 8 is arranged on the phosphor screen 9. The phosphor screen 9 forms bands to correspond to the respective gate electrodes 15. Each phosphor screen is made of a phosphor oxide or phosphor sulfide which emits light upon being bombarded by electrons accelerated by a high voltage of 4 kV to 10 kV generally used in a cathode-ray tube or the like.

In the first embodiment, the field control electrode 11 is formed to cover the entire surface of the insulating layer 5. Alternatively, the field control electrode 11 may be formed to selectively cover the insulating layer 5. Also, the field control electrode 11 may form a mesh to leave a portion in part of the insulating layer 5 where the field control electrode 11 does not exist.

When the field control electrode 11 is formed in this manner, a uniform electric field can be applied to the gate electrodes and the cathode having the carbon nanotubes. In a region where the field control electrode is formed, no electric field is generated by the potential difference between the cathode and anode electrode. Thus, damage caused by electric discharge to the electron-emitting sources, particularly the surfaces of the electron-emitting sources, can be prevented.

In this embodiment, to emit three primary colors consisting of red, green, and blue to display colors, three types of phosphor screens are used. Alternatively, to achieve monochrome display, one type of phosphor screen may be used.

The glass substrate 1 described above, the gate electrode substrate 13, and the front glass plate 10 formed with the front ribs 7 are sealed by using low-melting frit glass to sandwich spacers (not shown), thus forming a vacuum envelope. The interior of the vacuum envelope is held at a vacuum degree on the order of $10^{-5}$ Pa.

In this case, the band-like cathodes 12 formed on the glass substrate 1 oppose the insulating substrate 4 of the gate electrode substrate 13, and the field control electrode 11 of the gate electrode substrate 13 opposes the metal-backed film 8.

A method of manufacturing the flat panel display according to the first embodiment will be described.

The substrate ribs 2 are formed on the glass substrate 1 with a predetermined interval. For example, an insulating paste containing low-melting frit glass is formed on the glass substrate 1 repeatedly by screen printing until it reaches a predetermined height. After that, the insulating paste is calcined to form the substrate ribs 2. The height of the substrate ribs 2 is set equal to or smaller than that of the cathode 3.

When the substrate ribs 2 are formed in this manner, the space between the electron-emitting sources 14 and electrode layers 25 of the gate electrode substrate 13 which forms the gate electrodes can be defined by only the thickness of the insulating substrate 4.

Subsequently, the band-like cathodes 12 described above are arranged between the adjacent substrate ribs 2 formed on the glass substrate 1 to come into tight contact with the glass substrate 1, and regions for forming the electron-emitting sources 14 are formed in the band-like cathodes 12.

For example, a 426-alloy plate is prepared. A resist pattern is formed on those regions of the 426-alloy plate where no electron-emitting sources 14 will be formed. The 426-alloy plate is then half-etched to form regions where the electron-emitting sources 14 are to be formed. Half etching is to form openings, not open holes (through holes). The length in the direction of the long side is appropriately adjusted in accordance with the number of pixels of the flat panel display and the like.

The shape of each opening may be an oblique pattern or mesh pattern, a polygon such as a hexagon or triangle, a shape obtained by rounding the corners of such polygon, or a circle or ellipse.

The openings may be appropriately adjusted in size to form a matrix or lattice.

Alternatively, band-like cathodes 12 having regions for forming electron-emitting sources 14 in advance may be prepared.

A printing screen is brought into tight contact with the band-like cathodes 12 having the regions for forming the electron-emitting sources 14. A conductive paste containing nanotube fibers, e.g., carbon nanotubes, is filled in the regions for forming the electron-emitting sources 14 by screen printing.

For example, as the conductive paste containing carbon nanotubes, one obtained by kneading needle-like bundles (columnar graphite) mainly containing carbon nanotubes and having a length of about 10 μm and a silver paste (viscous solution having conductivity) with a mixing ratio of 1:1 is used.

The silver paste is a flowable silver in which silver particles (metal particles) with a particle size of about 1 μm are dispersed, together with glass particles with a particle size of about 1 μm, in a viscous vehicle obtained by dissolving a resin in a solvent. As the vehicle, a material that can decompose well and evaporate well, e.g., a material that can be removed when it is heated in the atmosphere at about 300° C. to 400° C., is used. As the glass particles, those that can be dissolved at about 300° C. to 400° C. are used.

Each nanotube fiber may have one end connected to the inner wall of that region of the band-like cathode 12 which forms the electron-emitting source 14, or may be curled or entangled with one end of another nanotube fiber.

In this case, the electron-emitting sources 14 may be prevented from coming into direct contact with the gate electrode substrate 13 by adjusting the depths of the openings or the thicknesses of the electron-emitting sources 14.

The printing mask is then removed. For example, the resultant structure is heated at about 450° C. for a specified period of time, and the conductive paste filled in the regions for forming the electron-emitting sources 14 and containing the carbon nanotubes is calcined, thus removing the printing screen.

The surface of the conductive film is then irradiated with a laser beam to selectively remove, by evaporation, the silver particles and a binder on the surface of the conductive film, so that the bundles are exposed. Also, carbon polyhedral particles as the carbon component other than the carbon nanotubes on the bundle surfaces are selectively removed, so that only the carbon nanotubes are uniformly exposed.

In this manner, the cathode 3 in which the electron-emitting sources 14 are formed on the band-like cathodes 12 is formed.

A method of manufacturing the gate electrode substrate 13 will be described.

First, the insulating substrate 4 having a thickness of about several μm to several ten μm is prepared. The band-like gate electrodes 15 which are equal in number to the number of rows of pixels of the flat panel display, made of, e.g., a conductive paste containing silver or carbon as the conductive material, and have a length of about 0.6 mm in the direction of the short side, are formed on the insulating substrate 4 by screen printing in a direction perpendicular to the cathode substrates 12 described above to be substantially parallel to each other.

The insulating layer 5 is formed on the insulating substrate 4 where the gate electrodes 15 are formed, to a thickness of several ten μm to several hundred μm.

The field control electrode 11 made of a conductive paste containing silver or carbon as the conductive material is formed on the entire surface of the insulating layer 5 by screen printing to a thickness of, e.g., about several ten μm, and is then calcined.

The length of the gate electrodes 15 in the direction of the long side is appropriately adjusted in accordance with the number of pixels of the flat panel display or the like. In this case, the adjacent gate electrodes 15 are formed at predetermined intervals.

The gate electrodes 15 are formed in this manner. When the band-like gate electrodes 15 are arranged on the insulating substrate 4, they may respectively expand by heat, and accordingly their size may change. Also, when the flat panel display vibrates, the gate electrodes 15 may also vibrate. In these cases, the change in size or the vibration of the gate electrodes 15 can be absorbed by the spaces between the gate electrodes 15.

Therefore, the adverse affect of the change in size or shift of the gate electrodes 15 against the cathode 3 can be decreased.

Although the gate electrodes 15 are formed by printing in this embodiment, they may be formed by photolithography, etching, or electrodeposition.

The electron-passing holes 6 are formed at the predetermined positions of the gate electrode substrate 13. The electron-passing holes 6 are formed at the predetermined positions of the gate electrode substrate 13 by using a carbon dioxide gas laser, or by sandblasting, laminated printing, or the like.

For example, assume that the electron-passing holes 6 have circular shapes each having a diameter of 0.2 mm to 0.4 mm. The number of electrons contributing to light emission, among electrons emitted from the electron-emitting sources 14, can be adjusted by adjusting the diameters of the electron-passing holes 6.

The front ribs 7 are formed on one major surface of the front glass plate 10. For example, an insulating paste containing low-melting frit glass is repeatedly screen-printed on the front glass plate 10 to reach a predetermined height, and is then calcined, thus forming the front ribs 7.

The front ribs 7 are formed such that their widths are 50 μm each and that the gap between that surface of the gate electrode substrate 13 where the gate electrodes 15 are formed and the metal-backed film 8 is 2.0 mm to 4.0 mm.

The gap between the front ribs 7 is set such that the phosphor screen 9 to be arranged in the region sandwiched by the front ribs 7 has a width of about 0.3 mm.

The phosphor screen 9 is formed in that region on the front glass plate 10 which is sandwiched by the front ribs 7. For example, a phosphor screen 9 made of a phosphor paste is screen-printed to form stripes, and is then calcined.

As the phosphor screen 9, the red-emitting phosphor screen 9R, green-emitting phosphor screen 9G, and blue-emitting phosphor screen 9B are used, such that each film has a thickness of 10 μm to 100 μm and a width of 0.3 mm.

One type of phosphor screen 9 may be used for monochrome display.

An aluminum thin film with a thickness of about 0.1 μm is formed on the formed phosphor screen 9. For example, the aluminum thin film is formed by employing known vapor deposition.

The gate electrode substrate 13 is placed on the glass substrate 1 having the cathode 3 such that the field control electrode 11 faces up. A spacer glass frame (not shown) is placed on the periphery of the glass substrate 1, and the front glass plate 10 having the phosphor screen 9, metal-backed film 8, and front ribs 7 is placed on the spacer glass frame. At this time, the front glass plate 10 is arranged such that the end faces of the respective front ribs 7 come into contact with the respective regions sandwiched by the band-like gate electrodes 15 formed on each insulating substrate 4.

The glass substrate 1, front glass plate 10, and spacer glass frame are adhered and fixed with low-melting frit glass, thus forming a vacuum envelope. An exhaust port formed in the spacer glass frame is connected to a vacuum pump, and the interior of the vacuum envelope is evacuated to a predetermined pressure. After that, the exhaust port is sealed.

According to this embodiment, when forming the substrate, the carbon tubes are exposed by irradiating the surface of the conductive film with a laser beam. Alternatively, the carbon tubes may be exposed not by laser beam irradiation but by selective dry etching using a plasma.

As the conductive paste containing the carbon nanotubes, a silver paste is used. Alternatively, another conductive paste may be used. For example, a conductive paste using particles made of a silver-copper alloy may be used. Alternatively, a conductive polymer may be used.

As the substrate for forming the vacuum envelope, the glass substrate 1 is used. However, the substrate is not limited to the glass substrate 1, but an insulating substrate such as a ceramic substrate may be used. The electron-emitting sources 14 may be formed by directly forming a CNT film on the band-like cathodes 12, e.g., a 426-alloy plate, by thermal CVD.

A driving circuit for the flat panel display will be described.

Figure 3:
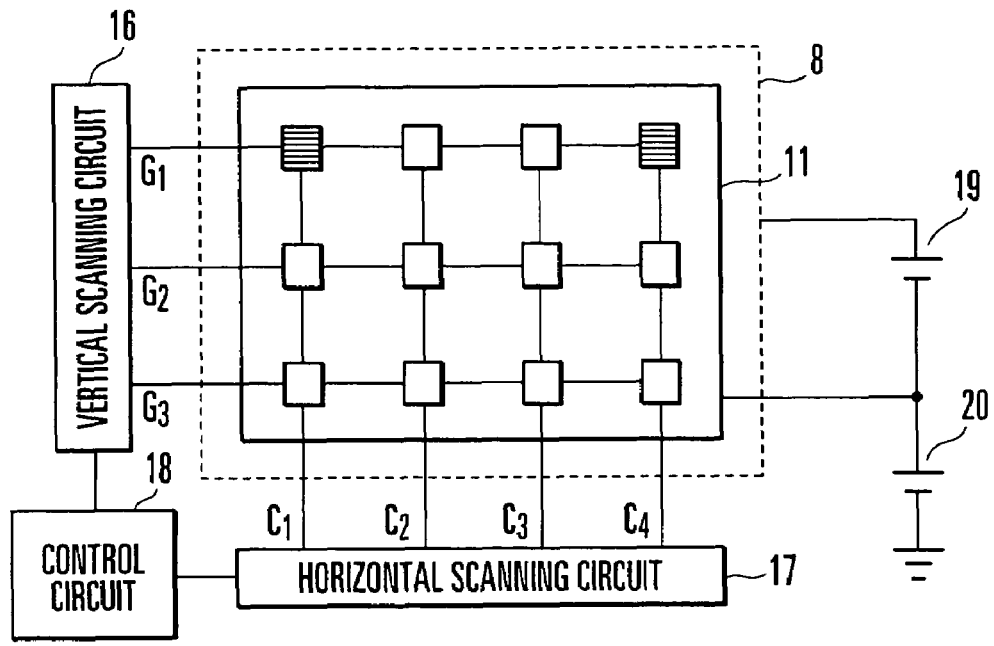
FIG. 3 is a diagram for explaining the arrangement of the flat panel display according to the first embodiment.
Figure 4:
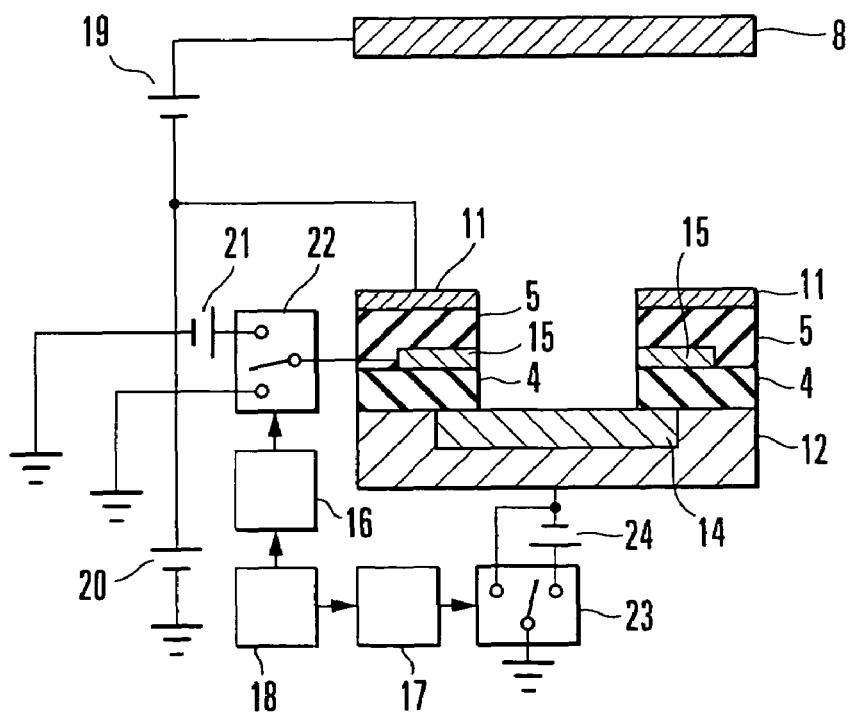
FIG. 4 is a diagram for explaining a driving circuit in one pixel of the flat panel display according to the first embodiment.

As shown in FIGS. 3 and 4, the flat panel display has an anode power supply 19 for applying an anode voltage to the anode electrode 8, a horizontal scanning circuit 17 for applying a cathode driving voltage to the cathode 3, a vertical scanning circuit 16 for applying a gate electrode driving voltage to the gate electrodes 15, a field control electrode driving power supply 20 for applying a field control electrode driving voltage to the field control electrode 11, and a control circuit 18 for controlling the vertical scanning circuit 16 and horizontal scanning circuit 17.

The anode power supply 19 constantly applies an anode voltage which is positive with respect to the cathode 3, e.g., a voltage of about 5 kV to 10 kV, to the anode electrode 8.

The field control electrode driving power supply 20 constantly applies a voltage which is positive with respect to the band-like cathodes 12, e.g., a voltage of about 1 kV, to the field control electrode 11. The voltage to be applied to the field control electrode driving power supply 20 is a voltage with which the potential difference between the field control electrode 11 and cathode 3 is lower than the potential difference that generates an electric field for causing the electron-emitting sources 14 to emit electrons.

The horizontal scanning circuit 17 sequentially applies a voltage to the band-like cathodes 12 by turning on/off cathode driving power supply switches 23 connected to the respective band-like cathodes 12, thus scanning the band-like cathodes 12. In this case, to perform light emission, a corresponding cathode driving power supply switch 23 is turned on, and a voltage of, e.g., −60 V, is applied to the corresponding band-like cathode 12. To prohibit light emission, the corresponding cathode driving power supply switch 23 is turned off, and a voltage of, e.g., 0 V, is applied to the corresponding band-like cathode 12.

The vertical scanning circuit 16 applies a voltage to the gate electrodes 15 by turning on/off gate electrode driving power supply switches 22 connected to the respective gate electrodes 15. In this case, the voltage to be applied to the gate electrodes 15 should have a predetermined potential difference from the voltage to be applied to the cathode 3 (described above).

For example, regarding an active row (a row where the cathode driving power supply switches 23 are ON), when the gate electrode driving power supply switches 22 are turned on, a gate electrode driving voltage, e.g., a voltage of 50 V, is applied to the gate electrodes 15. As a result, the potential difference between the gate electrodes 15 and cathode 3 is 110 V (50 V+60 V).

In this manner, the field control electrode driving power supply constantly applies a voltage (field control electrode driving voltage), which is positive with respect to the cathode, to the field control electrode 11. In this state, the gate electrode driving power supply applies a voltage lower than the field control electrode driving voltage to the gate electrodes. When a cathode is selected, a negative voltage has been applied to it.

The control circuit 18 separates signals of an image to be displayed into a signal necessary for the vertical scanning circuit 16 and a signal necessary for the horizontal scanning circuit 17. The control circuit 18 also controls the timings at which the horizontal scanning circuit 17 and vertical scanning circuit 16 apply the voltages.

The operation of the flat panel display will be described. A case will be described wherein three pixels are arranged in the direction of row and four pixels are arranged in the direction of column, as shown in FIG. 3. A case wherein a plurality of pixels are arranged in the directions of row and column can be explained in the same manner.

A case wherein pixels formed at regions where a gate electrode $G_1$ and band-like cathodes $C_1$ and $C_4$ intersect are to perform display will be described with reference to FIGS. 5A to 5C and FIGS. 6A to 6D.

The anode power supply 19 constantly applies an anode voltage which is positive with respect to the cathode 3 to the anode electrode 8. The field control electrode driving power supply 20 constantly applies a voltage which is positive with respect to the cathode 3, e.g., 1 kV, to the field control electrode 11.

The horizontal scanning circuit 17 scans the band-like cathodes 12 by sequentially applying a voltage to them in the pulse-like manner. For example, to cause light emission, the voltage is set to −60 V; to prohibit light emission, the voltage is set to 0 V. In this case, voltages of $c_{11}$, 0 V, 0 V, and $c_{41}$ are respectively applied to the band-like electrode $C_1$, a band-like electrode $C_2$, a band-like electrode $C_3$, and the band-like electrode $C_4$ (FIGS. 6A to 6D). For example, $c_{11}$ and $c_{41}$ are a negative voltage of −60 V. Then, electron-emitting sources 14 other than those with addresses being displayed do not emit electrons.

When a predetermined band-like cathode 12 is scanned, the gate electrode driving power supply switch 22 for a gate electrode $G_1$ corresponding to each pixel of an image to be displayed is turned on. Then, a predetermined voltage is applied to the gate electrode $G_1$ with respect to the cathode 3. For example, when a voltage of 50 V is applied to the gate electrode $G_1$, a potential difference of about 110 V is caused with respect to the cathode 3 (FIGS. 5A to 5C).

As a result, the potential differences of the intersecting regions of the band-like cathodes $C_1$ and $C_4$ and the gate electrode $G_1$ become 110 V, and the potential differences of the intersecting regions of the band-like cathodes $C_2$ and $C_3$ and the gate electrode $G_1$ become 0 V. An electric field generated when the potential difference between the band-like cathode 12 and gate electrode 15 becomes about 100 V causes the corresponding electron-emitting source 14 to emit electrons. Thus, the electron-emitting source 14 emits electrons.

In this embodiment, a case has been described wherein the active row of the gate electrodes 15 is held at a positive voltage while the remaining rows are held at 0 V. Alternatively, the gate electrodes 15 may be driven by holding the active row of the gate electrodes 15 at a positive voltage and applying a negative bias voltage of about several V to the remaining rows, so that electron-emitting sources other than those with addresses being displayed do not emit electrons.

As described above, when the remaining rows are set at 0 V, a negative voltage need not be used. Then, a negative voltage power supply becomes unnecessary. This is effective in cost reduction.

The voltage to be applied to the field control electrode 11 will be described with reference to FIGS. 7A and 7B. According to FIGS. 7A and 7B, when the potential difference between the cathode 3 and gate electrode 15 is a certain voltage Vth or less, no current flows. When a potential difference of Vth or more is applied, a current starts to flow. As the potential difference increases, the current also increases. This indicates that an electric field, generated when the potential difference between the electron-emitting source 14 and gate electrode 15 becomes Vth or more, causes the electron-emitting source 14 to emit electrons.

Figure 7A:
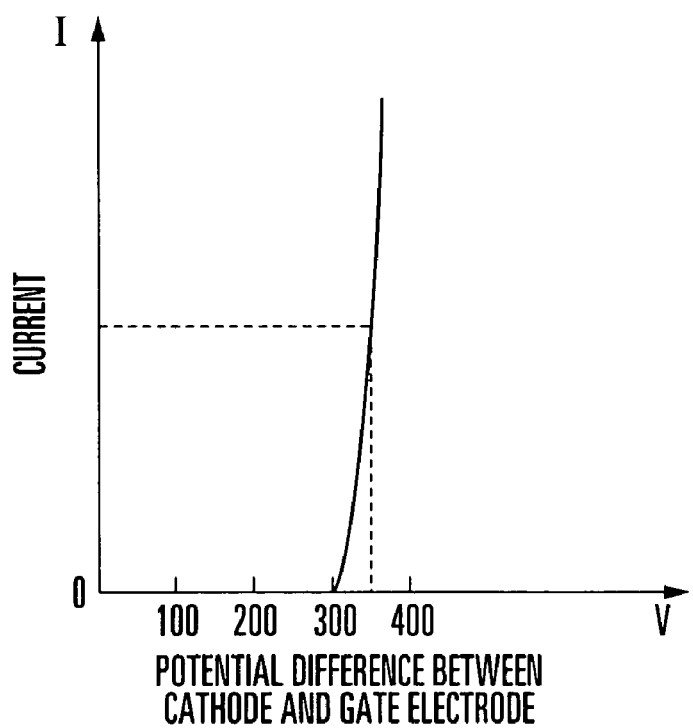
FIG. 7A is a graph for explaining a field control electrode driving voltage for a conventional flat panel display which has no field control electrode.
Figure 7B:
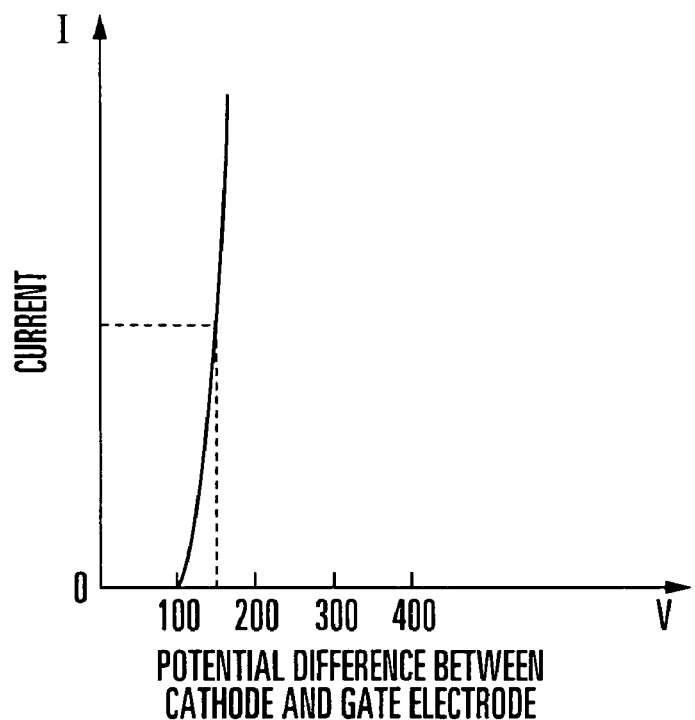
FIG. 7B is a graph for explaining a field control electrode driving voltage for the flat panel display having a field control electrode according to the first embodiment.

The voltage Vth is about 300 V in FIG. 7A, and is about 100 V in FIG. 7B. In this manner, when the field control electrode 11 is provided and a voltage which is positive with respect to the cathode 3 is constantly applied to the field control electrode 11, the voltage to be applied to the gate electrodes 15 can be decreased.

The electric field generated by the potential difference between the electron-emitting source 14 and gate electrode 15 changes also depending on the distance between the electron-emitting source 14 and gate electrode 15 or the like. Hence, the potential difference between the electron-emitting source 14 and gate electrode 15 and the distance between the electron-emitting source 14 and gate electrode 15 can be changed in various manners as far as they can generate an electric field that causes the electron-emitting source 14 to emit electrons.

Therefore, when a voltage which is positive with respect to the cathode 3 is applied to the field control electrode 11 in advance, the potential difference for generating an electric field that causes the electron-emitting source 14 to emit electrons can be decreased, and the voltage to be applied to the gate electrode 15 with respect to the cathode 3 can be decreased.

Then, when a very low gate voltage is applied to the gate electrode 15 arranged at a position closer to the electron-emitting source 14 than the field control electrode 11 is, the electron-emitting source 14 can emit electrons, so that the phosphor screen 9 can emit light. As a change in voltage between the gate and cathode can be decreased, a change in anode current can also be decreased. As a result, the anode current becomes uniform for each pixel, so that the display uniformity within the panel can be improved.

When the voltage to be applied to the gate electrode 15 is decreased, the driver cost can be reduced, so that the panel cost can be reduced.

According to the embodiment described above, as the gate electrode substrate is formed of the insulating substrate, the gate electrodes formed on the insulating substrate, the insulating layer formed on the gate substrate, and the field control electrode formed on the insulating layer, the voltage to be applied to each gate electrode can be decreased.

Since the field control electrode is provided, the gate electrodes and the cathode having the carbon nanotubes can be shielded. At a region where the field control electrode is formed, no electric field is caused by the potential difference between the cathode and anode electrode. Thus, damage caused by field concentration to the electron-emitting sources, particularly the surfaces of the electron-emitting surfaces, can be prevented. As a result, the cathode can emit electrons uniformly, thus improving the display uniformity within the panel.

Second Embodiment

The second embodiment will be described with reference to the accompanying drawings.

Figure 8:
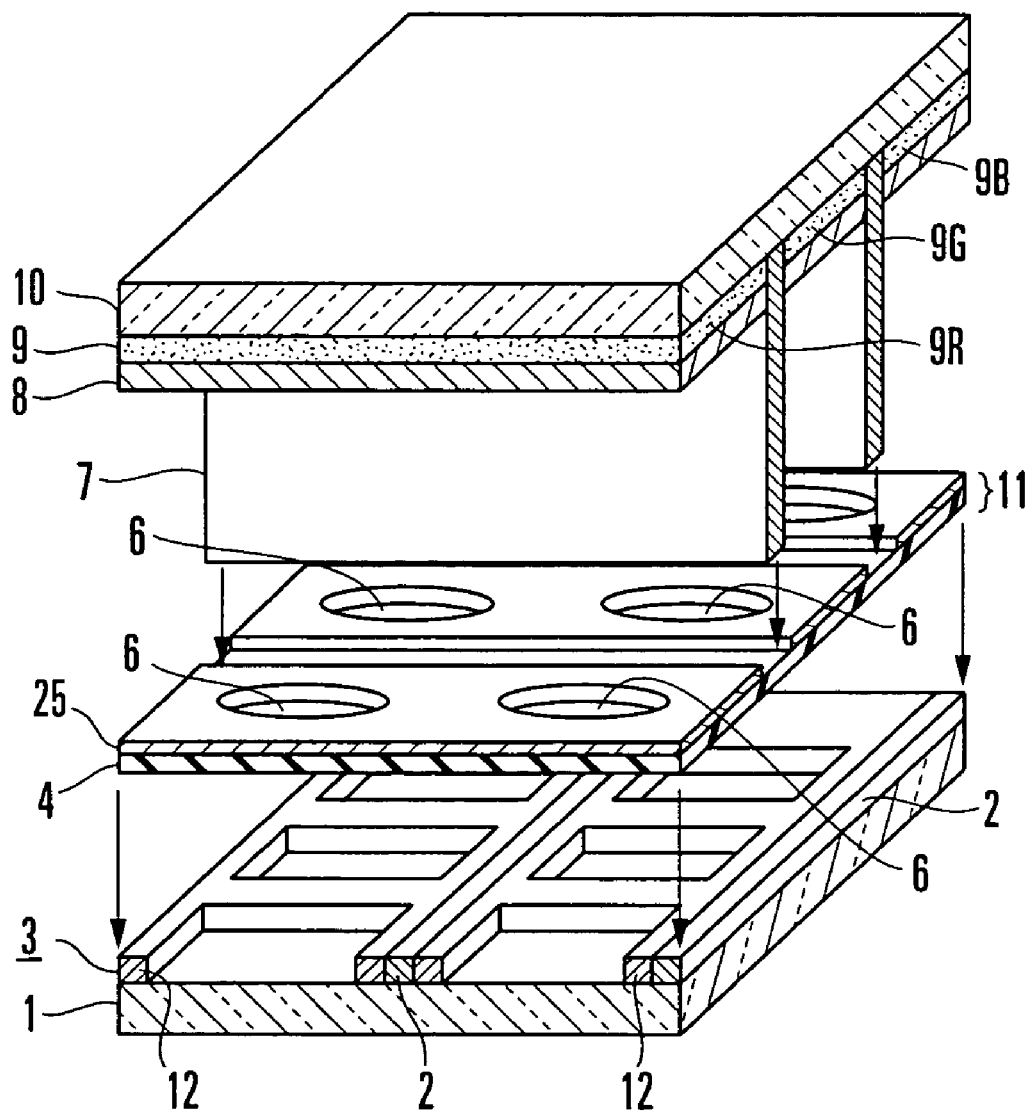
FIG. 8 is a schematic view for explaining the arrangement of a flat panel display according to the second embodiment.

A flat panel display according to the second embodiment is a flat panel display in which the structures of the gate electrode substrate and cathode are improved to improve the display uniformity. The flat panel display according to the second embodiment is constituted by a substrate, gate electrode substrates 11, front ribs 7, and a panel plate, as shown in FIG. 8.

The substrate will be described. The substrate is formed of a glass substrate 1 having a substantially rectangular shape when seen from the top, substrate ribs 2, and a cathode 3.

Figure 9A:
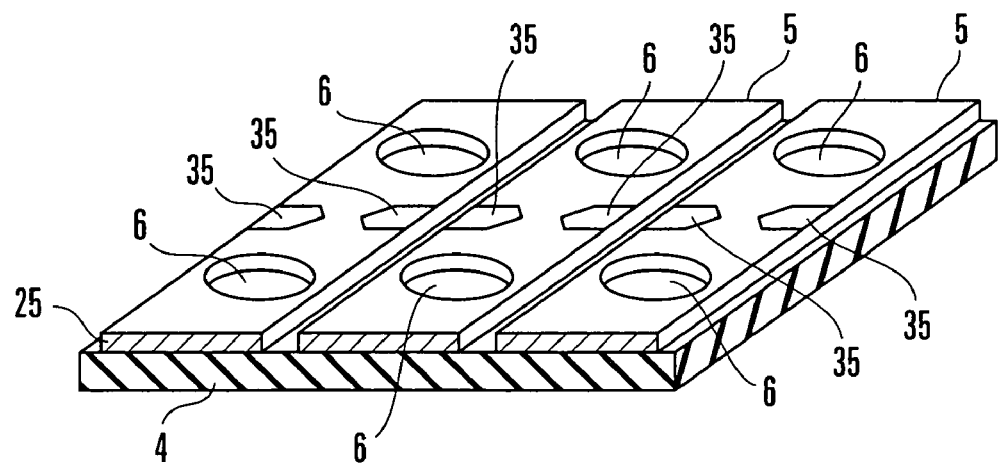
FIG. 9A is a schematic view for explaining a gate electrode substrate in the flat panel display according to the second embodiment.
Figure 9B:
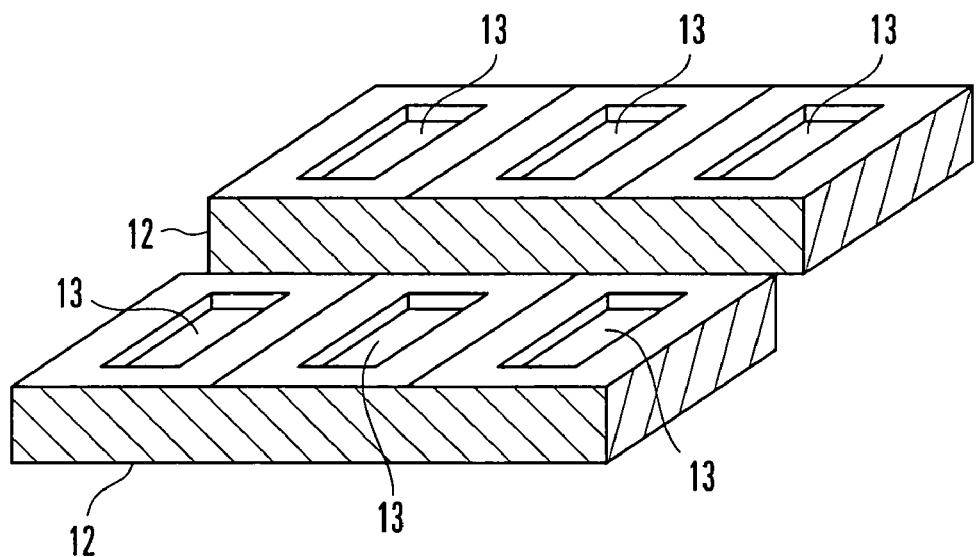
FIG. 9B is a schematic view for explaining cathode substrates in the flat display panel according to the second embodiment.

The cathode 3 is formed of cathode substrates 12 and electron-emitting sources 14. Each cathode substrate 12 is obtained by machining a substrate having a conductive surface, e.g., a metal member made of a 426-alloy and having a thickness of about 0.1 mm to 0.15 mm, into a band-like shape. Furthermore, as shown in FIG. 9B, electron-emitting source formation regions 13 are formed in the cathode substrate 12 by forming square openings in one major surface at a predetermined interval, and the electron-emitting sources 14 are formed in the electron-emitting source formation regions 13.

Figure 10A:
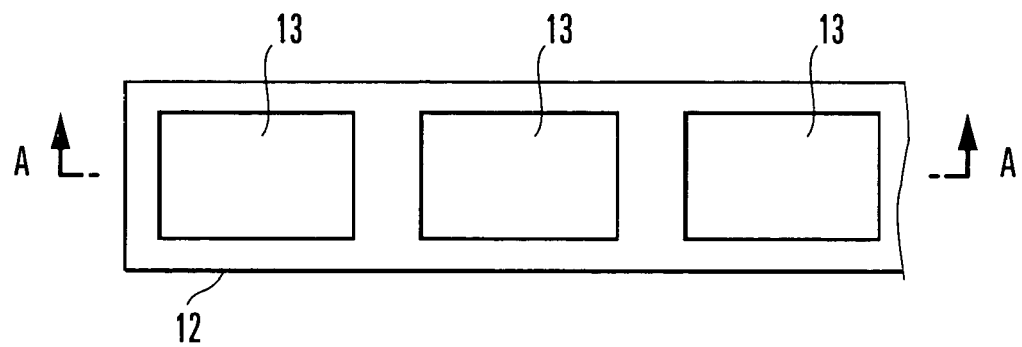
FIG. 10A is a schematic plan view for explaining a cathode substrate.
Figure 10B:
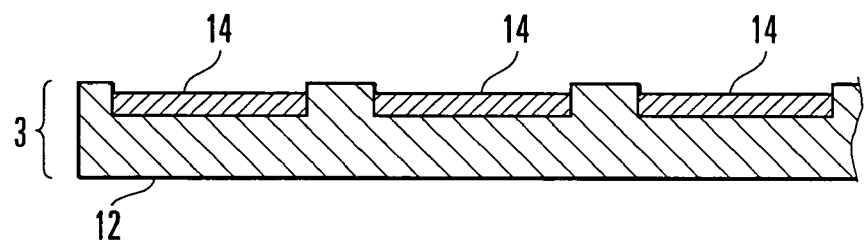
FIG. 10B is a schematic sectional view of a portion taken along A-A of FIG. 10A.

In the electron-emitting sources 14, as shown in FIGS. 10A and 10B, for example, a conductive material is filled in the electron-emitting source formation regions 13 to form conductive films, and a large number of nanotube fibers are formed to expose from the conductive films.

The carbon nanotubes can emit electrons from their distal ends by field emission when an electric field of about 100 V is applied to them. Also, the gaps between the adjacent electron-emitting source formation regions 13 can be formed narrow.

The nanotube fibers constituting the electron-emitting sources 14 are formed on the inner walls of the openings formed in the cathode substrate. Hence, the nanotube fibers do not come into contact with the gate electrode substrates 11, and the surfaces of the electron-emitting sources 14 and the lower surfaces of the gate electrode substrates 11 do not rub against each other during alignment, so that damage to the surfaces of the electron-emitting sources 14 can be prevented.

When the electron-emitting sources 14 are formed by burying in the openings, they can be formed flat.

A cathode 3 comes into contact with an insulating substrate 4 of the gate electrode substrates 11 in regions other than the regions where the openings are formed. Thus, the contact regions of the cathode 3 and gate electrode substrates 11 can be limited.

Figure 10C:
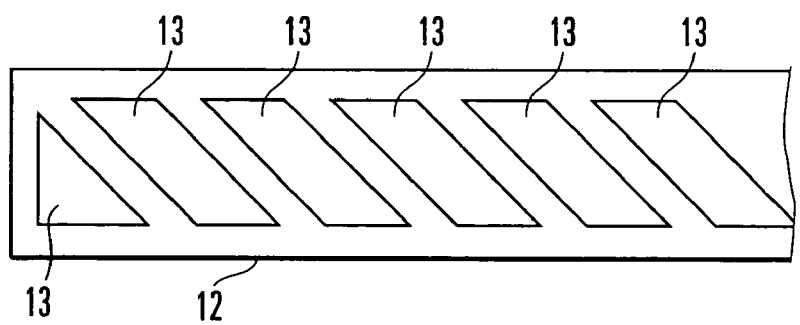
FIG. 10C is a schematic plan view of another cathode substrate.

The shape of each electron-emitting source formation region 13 is not limited to a square as described above, but can be an oblique pattern or mesh pattern, as shown in, e.g., FIG. 10C, a polygon such as a hexagon or triangle, a shape obtained by rounding the corners of such polygon, or a circle or ellipse. The openings may form a matrix, or a lattice.

The substrate has a structure in which the cathode substrates 12 are arranged in number corresponding to the number of scanning lines of the flat panel display to be substantially parallel to each other and the substrate ribs 2 are arranged between the adjacent cathode substrates 12.

The gate electrode substrates 11 will now be described. Each gate electrode substrate 11 is formed of the insulating substrate 4 and electrode layers (gate electrodes) 25, as shown in FIG. 9A. A reinforcing layer may be further formed. The electrode layers 25 have band-like shapes. The electrode layers 25 are arranged, in number corresponding to the number of rows of the pixels of the flat panel display, on the insulating substrate 4 to be substantially parallel to each other and to substantially intersect the cathode substrates 12.

If necessary, spaces may be formed between the arranged electrode layers 25. The electrode layers 25 form the band-like shapes in this manner. When the band-like electrode layers 25 are arranged on the insulating substrate 4, they may respectively expand by heat, and accordingly their size may change. Also, when the flat panel display vibrates, the electrode layers 25 may also vibrate. In these cases, the change in size or the vibration of the electrode layers 25 can be absorbed by the spaces between the electrode layers 25. Therefore, the electrode layers 25 can be prevented from shifting with respect to the cathode 3.

Electron-passing holes 6 serving as through holes extending through the electrode layers 25 and insulating substrate 4 are formed in those regions of the gate electrode substrates 11 which intersect the cathode substrates 12. Electrons emitted from the electron-emitting sources 14 pass through the electron-passing holes 6 and are accelerated toward a metal-backed film 8.

The gate electrode substrates 11 have notches 35 at least at part of their regions intersecting the cathode substrates 12. The notches 35 can be formed above the substrate ribs 2 as far as they are formed in the intersecting regions of the gate electrode substrates 11 and cathode substrates 12. The notches 35 can decrease the intersecting area of the gap sandwiched by the electrode layers 25 of the gate electrode substrates 11 and the cathode substrates 12, as shown in FIGS. 11A and 11B.

Figure 11A:
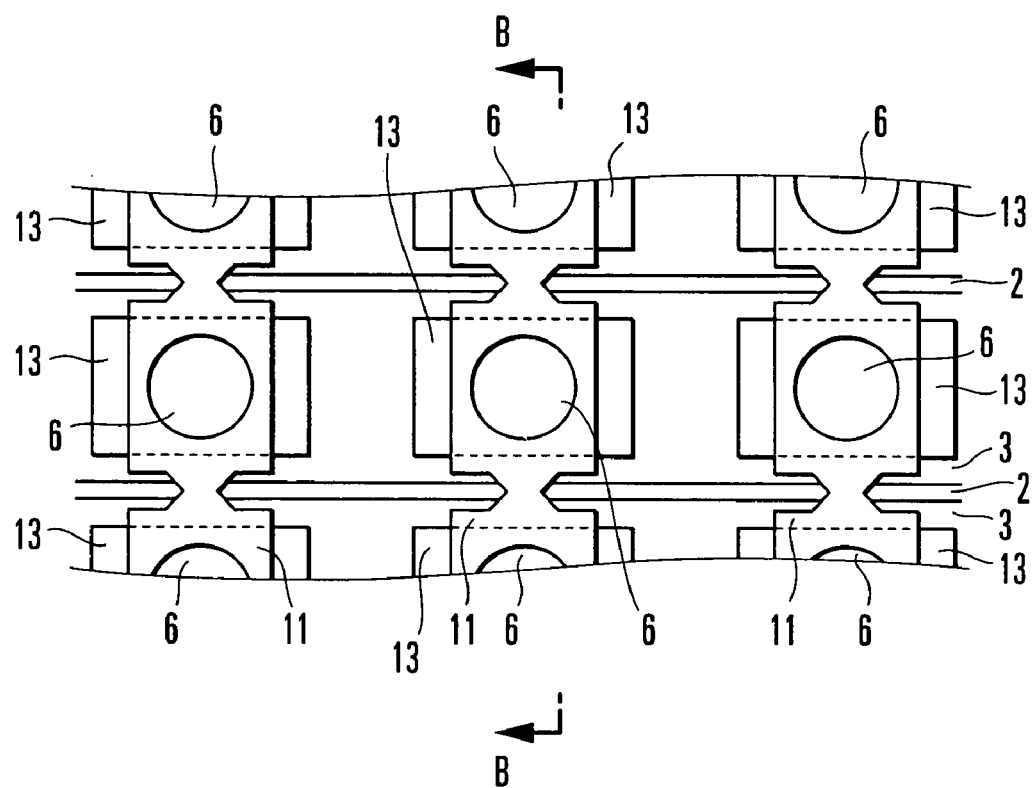
FIG. 11A is a schematic front view of the main part of a flat panel display.
Figure 11B:
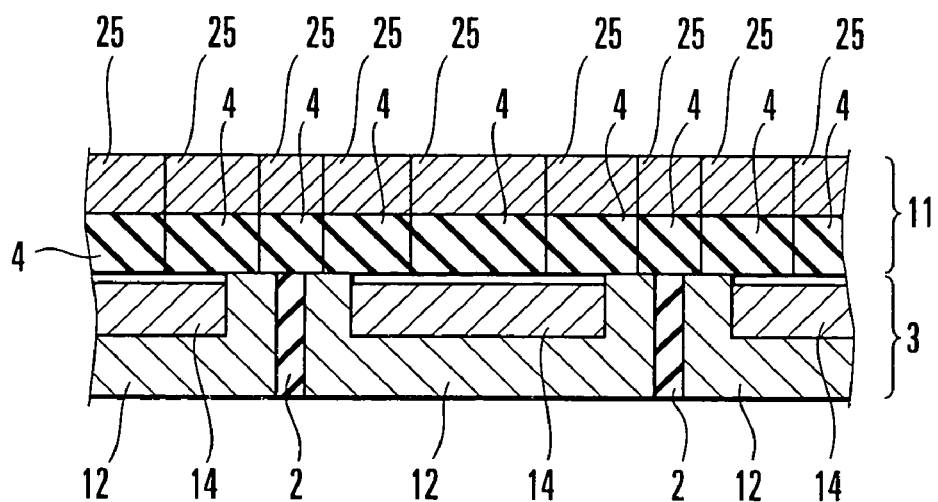
FIG. 11B is a sectional view of a portion taken along B-B of FIG. 11A.

In FIG. 11A, the notches 35 are formed, on the region to be arranged on the cathode substrates 12 including the substrate ribs 2, to be axi-symmetrical with respect to the center line in the longitudinal direction of the band-like electrode layers 25. Then, as shown in FIG. 11B, a region where no gate electrode substrates 11 exist is present on the cathode 3. This can decrease the intersecting area of the gap sandwiched by the cathode 3 and the electrode layers 25 of the gate electrode substrates 11.

A stray capacitance is formed in the intersecting region of the gap sandwiched by the electrode layers 25 of the gate electrode substrates 11 and the cathode 3. The stray capacitance is proportional to the dielectric constant of the material of the substrate ribs 2 and the intersecting area of the gate electrode substrates 11 and cathode 3, and is inversely proportional to the thickness (height) of the substrate ribs 2. The stray capacitance generates floating charges. The floating charges are charges that are emitted without externally applying a voltage, and influence light emission to change the brightness.

When the stray capacitance increases, the load capacitance generated when the flat panel display is driven increases, and accordingly the response speed decreases. Also, an increase in stray capacitance causes variations in the response speed of each pixel. As a result, the display uniformity within the panel fluctuates.

When the notches 35 described above are formed, the area of the intersecting region in the gap sandwiched by the electrode layers 25 of the gate electrode substrates 11 and the cathode 3 can be decreased, so that the stray capacitance can be decreased. Thus, stable brightness can be realized, and the response speed of the circuit signal can be increased. As the fluctuations in area of the intersecting region also decrease, the response speeds of the pixels can be made uniform. Consequently, the display uniformity within the panel can be improved.

The panel plate will now be described.

The panel plate is formed of a front glass plate 10 having a substantially square shape when seen from the top, a phosphor screen 9, and the metal-backed film 8. For example, the metal-backed film 8 is formed of an aluminum thin film having a thickness of about 0.1 µm. The metal-backed film 8 serves as an anode.

The phosphor screen 9, e.g., a red-emitting phosphor screen 9R, green-emitting phosphor screen 9G, and blue-emitting phosphor screen 9B, is formed in the region between the front ribs 7 arranged on the front glass plate 10, and the metal-backed film 8 is arranged on the phosphor screen 9. The phosphor screen 9 is arranged to oppose the gate electrode substrates 11.

The substrate described above, the gate electrode substrates 11, and the panel plate formed with the front ribs 7 are sealed by using low-melting frit glass to sandwich spacers (not shown), thus forming a vacuum envelope. The interior of the vacuum envelope is held at a vacuum degree on the order of $10^{-5}$ Pa.

In this case, the cathode 3 formed on the substrate oppose the insulating substrate 4 of the gate electrode substrates 11, and the electrode layers 25 of the gate electrode substrates 11 oppose the metal-backed film 8 of the panel plate.

In the flat panel display described above, the notches 35 are formed in the gate electrode substrates 11 so that the intersecting area in the gap sandwiched by the cathode 3 and the electrode layers 25 of the gate electrode substrates 11 is decreased. Alternatively, opening portions 26 formed of open holes may be formed, as shown in FIGS. 12A and 12B, so that the intersecting area in the gap sandwiched by the cathode 3 and the electrode layers 25 of the gate electrode substrates 11 can be decreased.

Figure 12A:
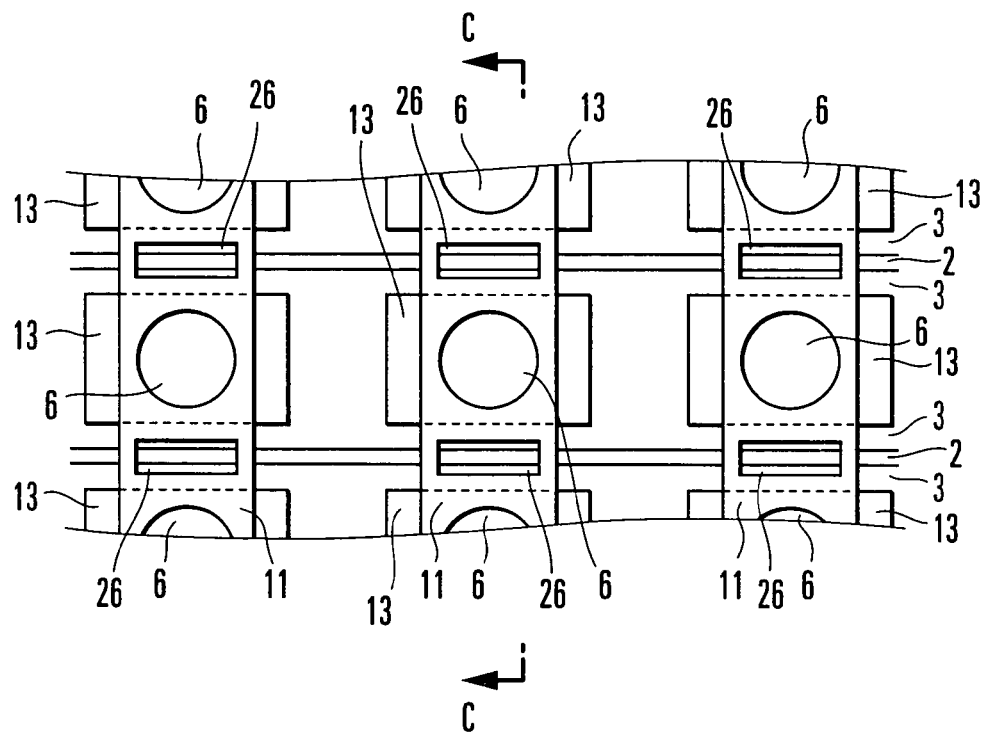
FIG. 12A is a schematic front view of the main part of another flat panel display.
Figure 12B:
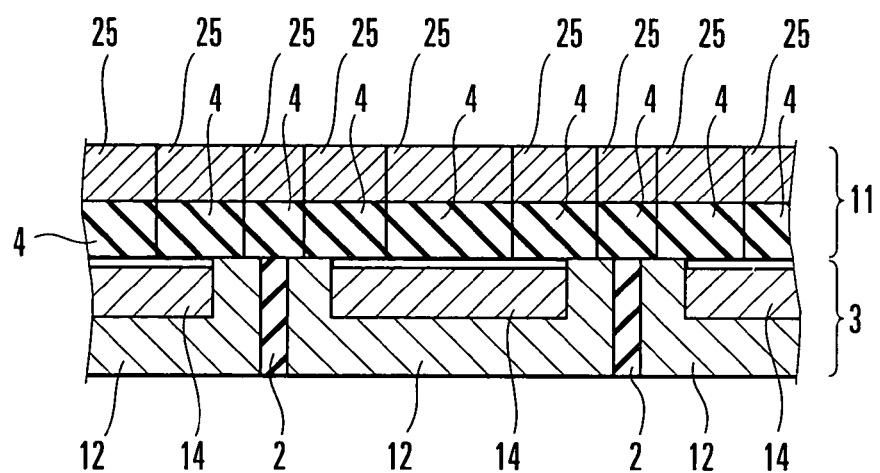
FIG. 12B is a sectional view of a portion taken along C-C of FIG. 12A.

In FIG. 12A, the opening portions 26 are formed in the region above the cathode 3 including the substrate ribs 2. Then, as shown in FIG. 12B, a region where no gate electrode substrates 11 exist is present on the cathode 3. This can decrease the intersecting area of the cathode 3 and gate electrode substrates 11.

When the opening portions 26 are formed, each gate electrode substrate 11 is supported on the respective substrate ribs 2 at two points including its perimeter. Thus, the gate electrode substrate 11 is stably supported against vibration or the like.

Figure 13A:
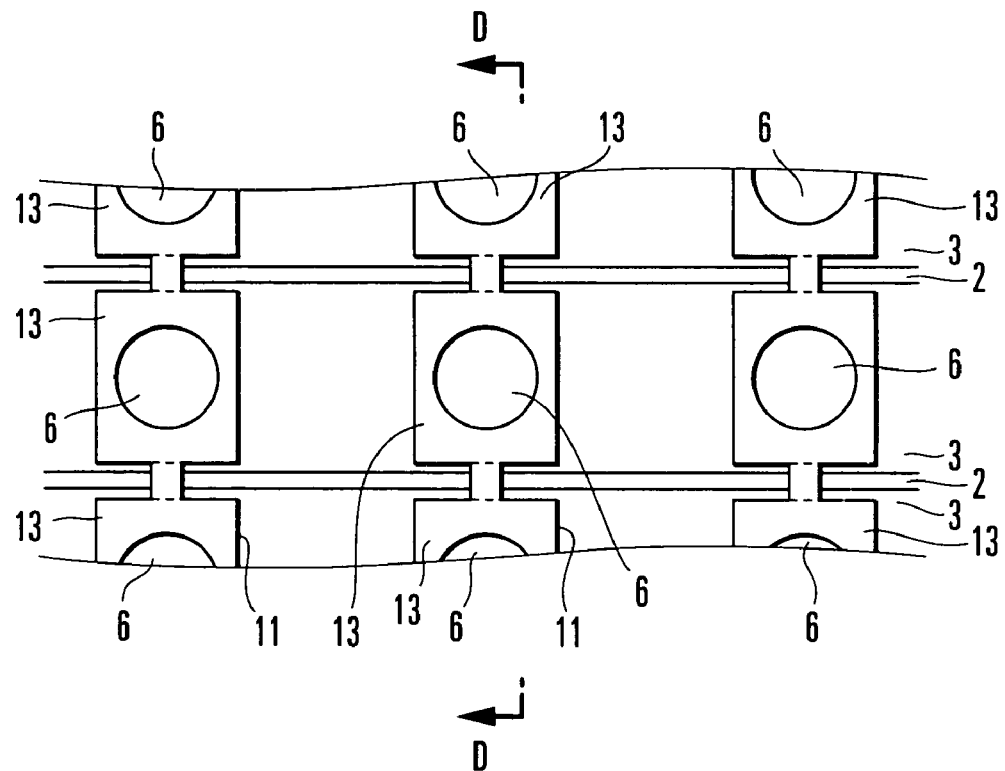
FIG. 13A is a schematic front view of the main part of still another flat panel display.
Figure 13B:
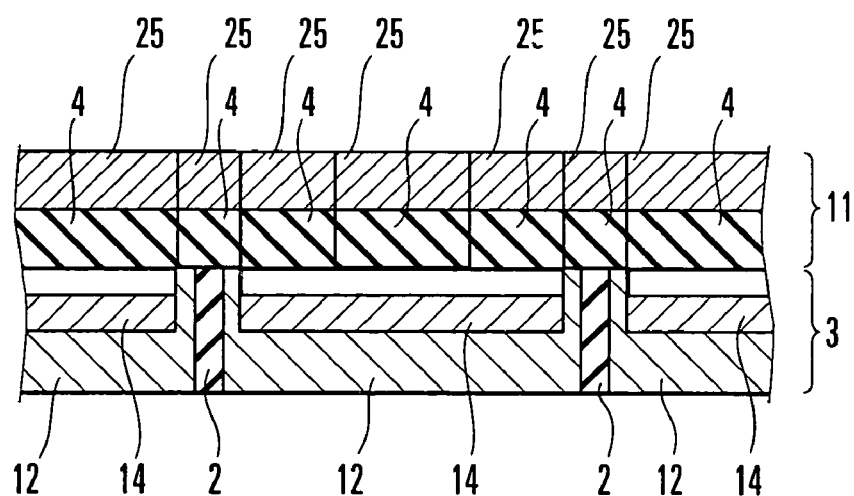
FIG. 13B is a sectional view of a portion taken along D-D of FIG. 13A.

As shown in FIGS. 13A and 13B, the gate electrode substrate 11 may be so formed as to extend only above the electron-emitting source formation regions 13, so that the intersecting area in the gap sandwiched by the cathode 3 and the electrode layers 25 of the gate electrode substrates 11 can be decreased. Then, as shown in FIG. 13B, the intersecting area in the gap sandwiched by regions other than the electron-emitting sources 14 and the electrode layers 25 of the gate electrode substrates 11 can be eliminated.

Figure 14A:
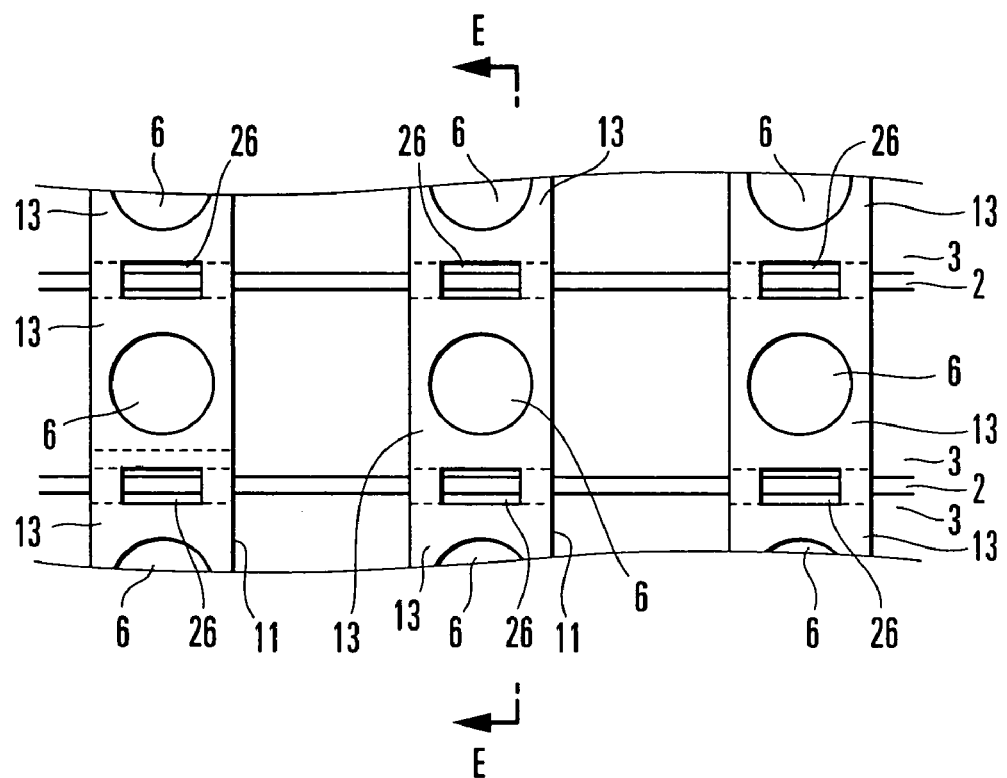
FIG. 14A is a schematic front view of the main part of still another flat panel display.
Figure 14B:
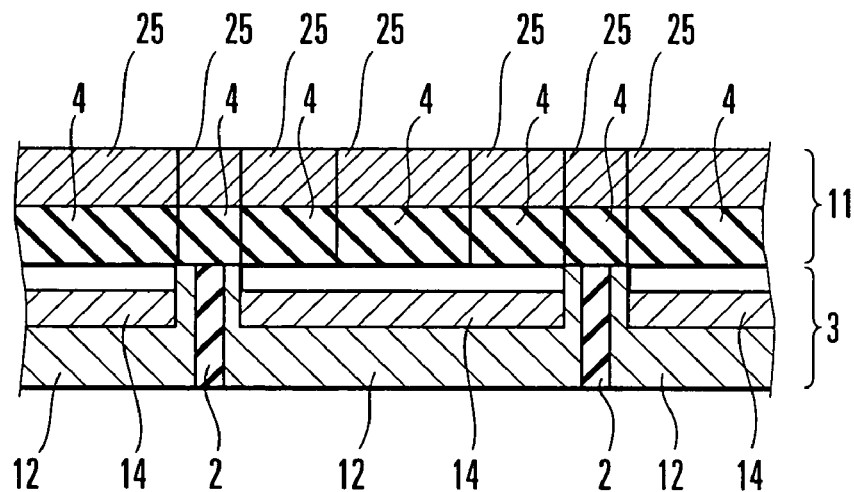
FIG. 14B is a sectional view of a portion taken along E-E of FIG. 14A.

As shown in FIGS. 14A and 14B, the gate electrode substrates 11 may be so formed as to extend only above the electron-emitting source formation regions 13, and the opening portions 26 formed of open holes may be formed, so that the intersecting area of the cathode 3 and gate electrode substrates 11 can be decreased. Then, as shown in FIG. 14B, the intersecting area of regions other than the electron-emitting sources 14 and the gate electrode substrates 11 can be decreased.

When the opening portions 26 are formed, each gate electrode substrate 11 is supported on the respective substrate ribs 2 at two points including its perimeter. Thus, the gate electrode substrate 11 is stably supported against vibration and the like.

Figure 15A:
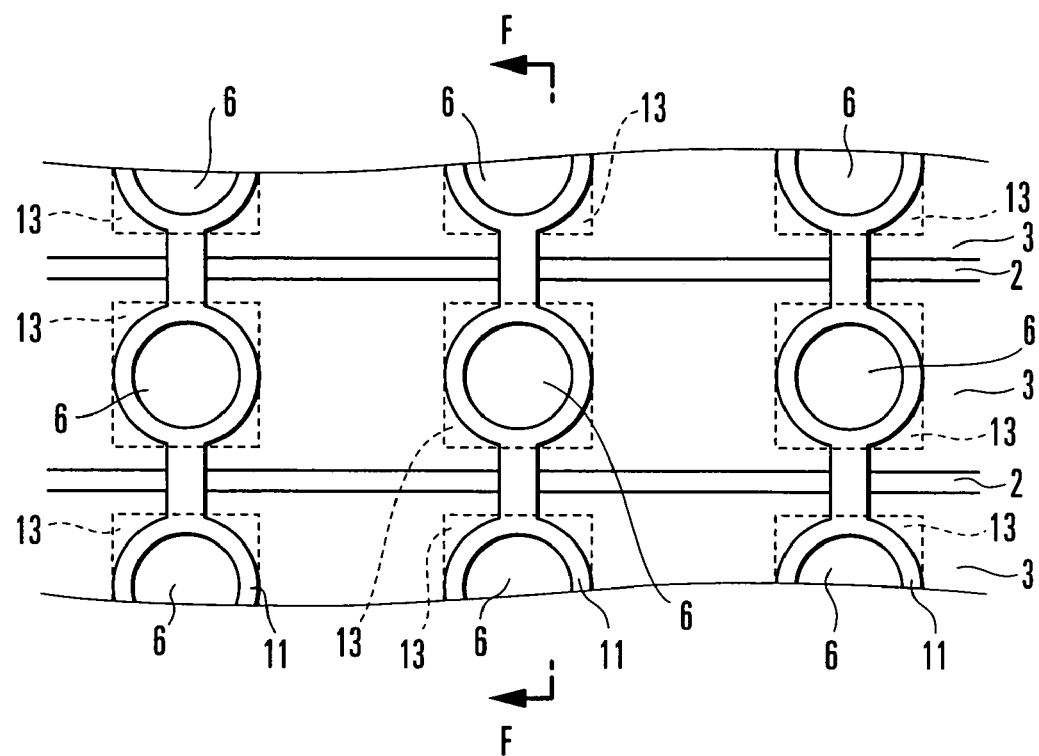
FIG. 15A is a schematic front view of the main part of still another flat panel display.
Figure 15B:
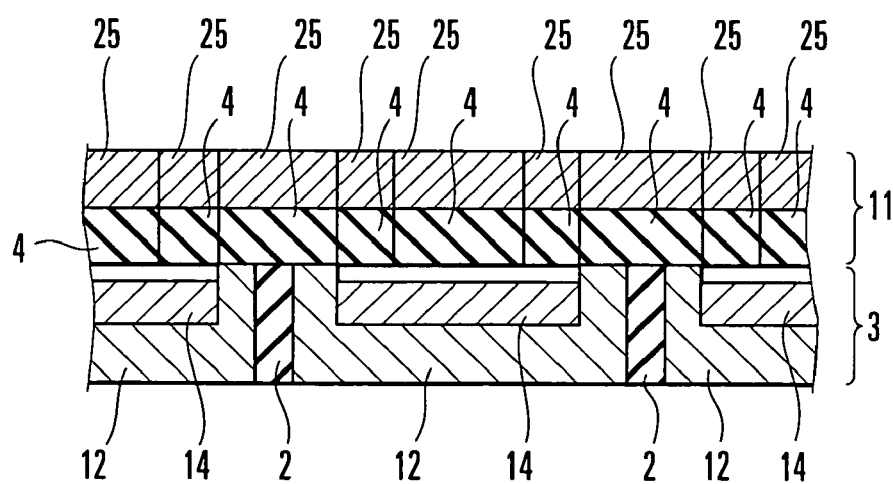
FIG. 15B is a sectional view of a portion taken along F-F of FIG. 15A.

As shown in FIGS. 15A and 15B, the gate electrode substrates 11 may be formed to have a ring-like shape, so that the intersecting area of the cathode 3 and gate electrode substrates 11 can be decreased. Then, as shown in FIG. 15B, the intersecting area of the cathode 3 including the electron-emitting sources 14 and the gate electrode substrates 11 can be decreased.

Figure 16A:
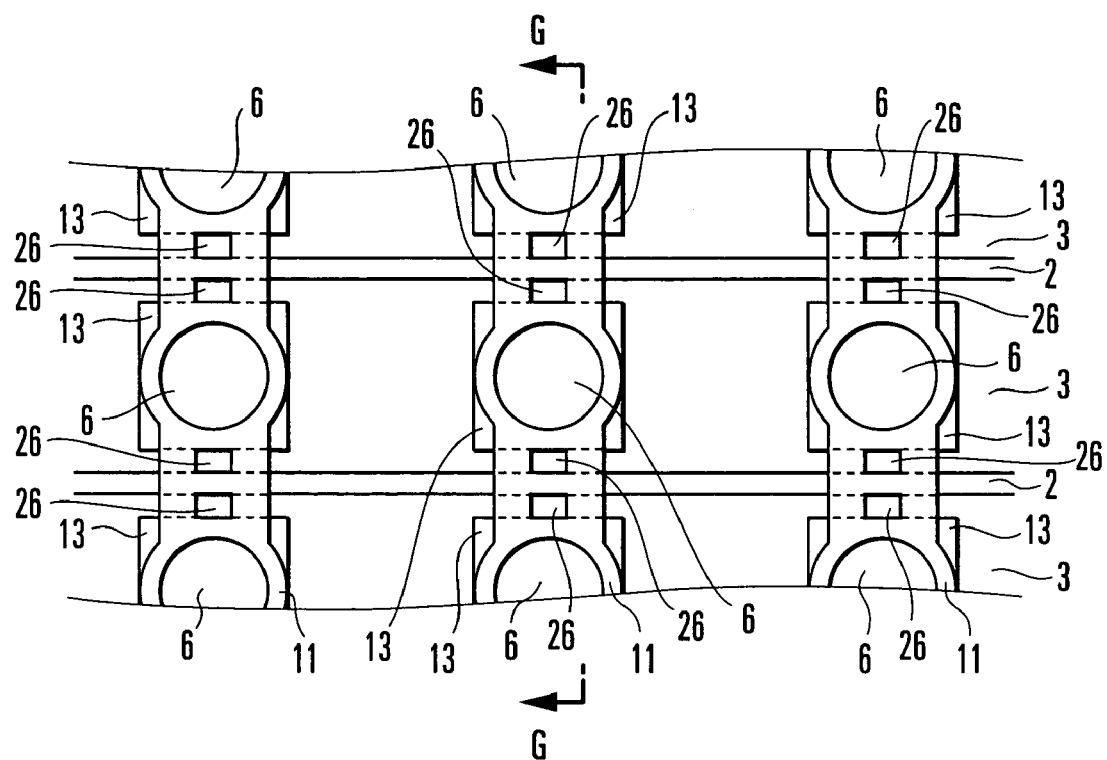
FIG. 16A is a schematic front view of the main part of still another flat panel display.
Figure 16B:
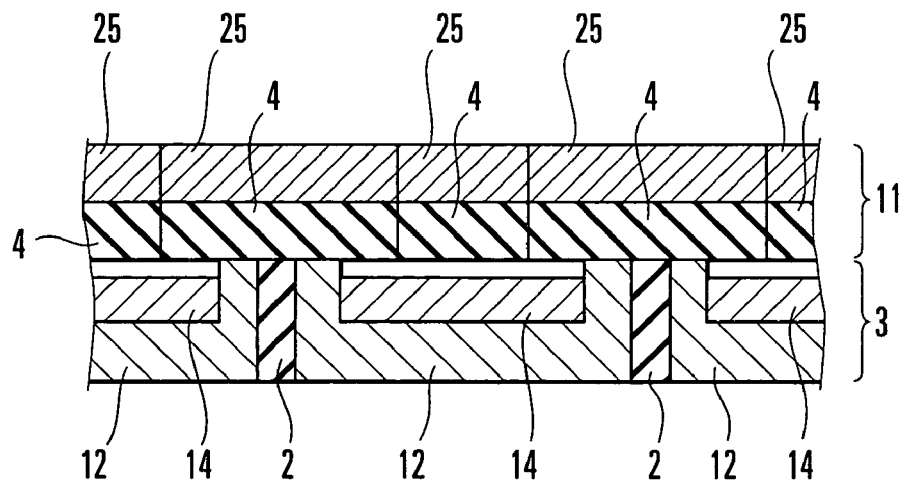
FIG. 16B is a sectional view of a portion taken along G-G of FIG. 16A.
Figure 17:
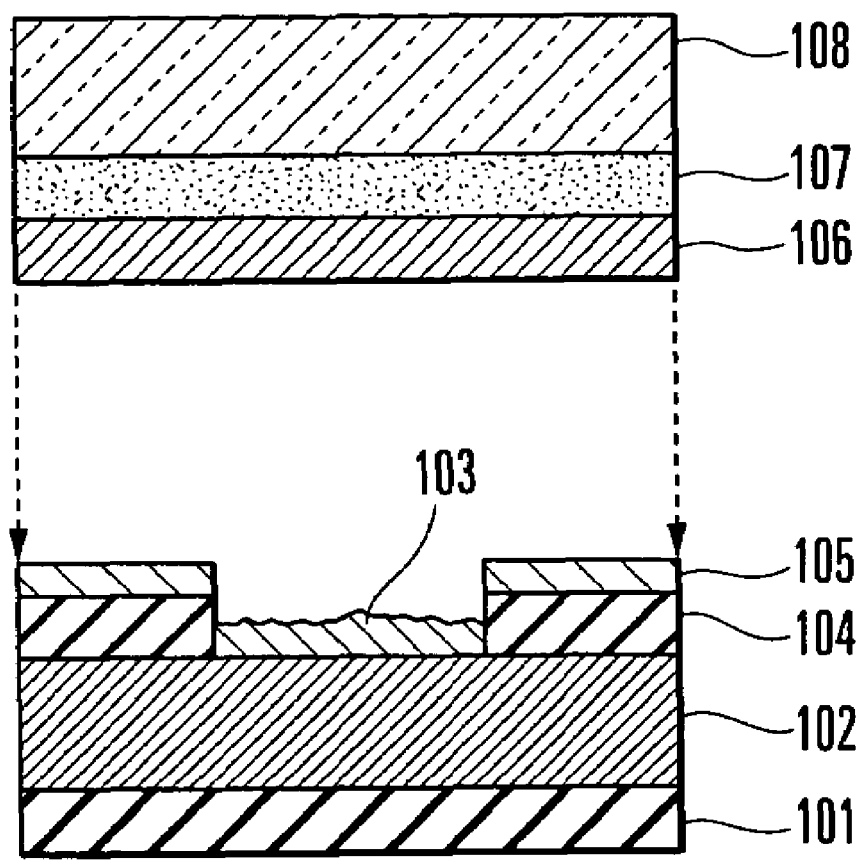
FIG. 17 is a schematic sectional view for explaining the arrangement of a conventional flat panel display.

As shown in FIGS. 16A and 16B, the gate electrode substrates 11 may be formed to have ring-like shapes, and the opening portions 26 formed of open holes may be formed to leave the gate electrode substrates 11 on the substrate ribs 2, so that the intersecting area in the gap sandwiched by the cathode 3 and the electrode layers 25 of the gate electrode substrates 11 can be decreased. Then, as shown in FIG. 16B, the intersecting area in the gap sandwiched by the cathode 3 including the electron-emitting sources 14 and the electrode layers 25 of the gate electrode substrates 11 can be decreased.

When the opening portions 26 are formed to leave the gate electrode substrates 11 on the substrate ribs 2, the gate electrode substrates 11 are supported by the respective substrate ribs 2. Thus, the gate electrode substrates 11 can be stably supported against vibration or the like.

The operation of the flat panel display according to the second embodiment will be described.

First, operation regarding one pixel will be described.

A potential difference is set between the cathode 3 and the electrode layers 25 of the gate electrode substrates 11 such that the electrode layers 25 have a positive potential. Then, the electric field concentrates on the nanotube fibers, e.g., the carbon nanotubes, of the electron-emitting sources 14 present in regions where the gate electrode substrates 11 and cathode 3 intersect. The carbon nanotubes set in a high electric field emit electrons from their distal ends.

The electrons emitted from the electron-emitting sources 14 are accelerated toward the metal-backed film 8 to which a positive electric field (acceleration voltage) is applied, and are transmitted through the metal-backed film 8 to bombard against the phosphor screen 9. Thus, phosphors emit light.

The operation of a flat panel display with a structure in which the gate electrode substrates 11 with a predetermined number of electrode layers 25 in the direction of columns are provided and a predetermined number of cathodes 3 in the direction of rows are provided to correspond to the gate electrode substrates 11 will be described.

With the metal-backed film 8 being applied with a positive voltage (acceleration voltage), a predetermined positive voltage is applied to the electrode layer 25 of the first-row gate electrode substrate 11. Sequential scanning is performed to apply a predetermined negative voltage to the cathodes 3 at addresses with which the first to predetermined rows emit light. This operation is performed from the first- to predetermined-column electrode layers 25. Then, dot matrix display can be performed.

In this case, the cathodes 3 and electrode layers 25 to which no voltage is applied are set to 0 V. Alternatively, a negative bias voltage of about several V is applied to the electrode layers 25 with respect to the cathodes 3. Then, electron-emitting sources 14 other than those with addresses being displayed do not emit electrons.

Alternatively, the voltage to be applied to the cathodes 3 may include two different voltages, i.e., 0 V and a positive voltage. To perform light emission, 0 V may be applied. To prohibit light emission, the positive voltage may be applied.

In this case, regarding the electrode layers 25, the active rows are maintained at a positive voltage, and a negative bias voltage of 0 V or about several V is applied to the remaining rows, so that electron-emitting sources 14 other than those with addresses being displayed do not emit electrons. For example, the voltage to be applied to the metal-backed film 8 is set to 6 kV, and the voltage to be applied to the electrode layers 25 of the gate electrode substrates 11 is set to include two different voltages, i.e., 500 V and 0 V. Then, no negative voltage need be used. Thus, no negative voltage power supply is necessary, and cost reduction can be achieved.

In the flat panel display according to this embodiment, as the gate electrode substrates 11 have at least the notches 35 and opening portions 26, the area of the intersecting region in the gap sandwiched by the electrode layers 25 of the gate electrode substrates 11 and the cathodes 3 can be decreased. Thus, the stray capacitance decreases, stable brightness can be realized, and the response speed of the circuit signal can be increased. As the variations in area of the intersecting area also decrease, the response speed of each pixel can be made uniform. As a result, the display uniformity within the panel can be improved.

A method of manufacturing the flat panel display according to the second embodiment will be described.

First, the substrate ribs 2 are formed on the glass substrate 1 with a predetermined interval. For example, an insulating paste containing low-melting frit glass is formed on the glass substrate 1 repeatedly by screen printing until it reaches a predetermined height. After that, the insulating paste is calcined to form the substrate ribs 2. The height of the substrate ribs 2 is set equal to or smaller than that of the cathode 3.

Subsequently, the cathode substrates 12 described above are arranged between the adjacent substrate ribs 2 formed on the glass substrate 1 to come into tight contact with the glass substrate 1, and the electron-emitting source formation regions 13 for forming the electron-emitting sources 14 are formed on the cathode substrates 12.

For example, a 426-alloy plate having a length of 0.7 mm in the direction of the short side and a thickness of about 0.15 mm is prepared. A resist pattern is formed on those regions of the 426-alloy plate where no electron-emitting source formation regions 13 will be formed. The 426-alloy plate is then half-etched to form the electron-emitting source formation regions 13. Half etching is to form openings, not open holes (through holes). The length in the direction of the long sides is appropriately adjusted in accordance with the number of pixels of the flat panel display and the like.

For example, each opening has a size of about 0.5 mm×0.7 mm×0.15 mm. The depth of each opening can be arbitrarily set between 0.1 mm and 0.3 mm. In this case, a thick 426-alloy plate is prepared.

Alternatively, cathode substrates 12 having electron-emitting source formation regions 13 in advance may be prepared.

A printing mask is brought into tight contact with the cathode substrates 12 having the electron-emitting source formation regions 13. Nanotube fibers are filled in the electron-emitting source formation regions 13 by screen printing.

Each nanotube fiber may have one end connected to the inner wall of the electron-emitting source formation region 13 of the corresponding cathode substrate 12, or may be curled or entangled with one end of another nanotube fiber. Since the electron-emitting source formation regions 13 are formed by forming openings in the cathode substrates 12, the electron-emitting sources 14 can be so formed as not to come into direct contact with the gate electrode substrates 11.

In this case, the electron-emitting sources 14 may be prevented from coming into direct contact with the gate electrode substrates 11 by adjusting the depths of the openings or the thicknesses of the electron-emitting sources 14.

As the electron-emitting source formation regions 13 are formed by utilizing the openings, the conductive paste containing the carbon nanotubes can be prevented from flowing to the glass substrate 1.

The printing mask is then removed. For example, the resultant structure is heated at about 450° C. for a specified period of time, and the conductive paste filled in the electron-emitting source formation regions 13 and containing the carbon nanotubes is calcined, thus removing the printing screen. Hence, conductive films containing bundles are formed in the electron-emitting source formation regions 13. The conductive films are formed in the electron-emitting source formation regions 13, e.g., narrow spaces each of about 0.5 mm×0.7 mm. When the conductive paste is calcined and glass particles contained in it dissolve, it forms no swell on its surface but is made flat. As a result, flat conductive films with small variations in thickness can be obtained.

When the electron-emitting sources 14 are formed by burying in the openings in this manner, they can be formed flat.

The surfaces of the conductive films are then irradiated with a laser beam to selectively remove, by evaporation, the silver particles and a binder on the surfaces of the conductive films, so that the bundles are exposed. Also, carbon polyhedral particles as the carbon component other than the carbon nanotubes on the bundle surfaces are selectively removed, so that only the carbon nanotubes are uniformly exposed.

In this manner, the cathode in which the electron-emitting sources 14 are formed on the cathode substrates 12 is formed.

A method of manufacturing the gate electrode substrates 11 will be described.

To form the gate electrode substrates 11, the electrode layers 25 made of a conductive paste containing silver or carbon as the conductive material is formed on the insulating substrate 4 with a predetermined pattern by screen printing to a thickness of, e.g., about 10 µm, and is then calcined.

For example, the band-like electrode layers 25 equal in number to the number of rows of the pixels of the flat panel display, each having a length of about 0.6 mm in the direction of the short side, are formed on the insulating substrate 4 to be substantially parallel to each other. The length in the direction of the long side is appropriately adjusted in accordance with the number of pixels of the flat panel display or the like. In this case, the adjacent gate electrodes 15 may be formed at predetermined intervals.

The band-like electrode layers 25 are formed in this manner. When the band-like electrode layers 25 are arranged on the insulating substrate 4, they may respectively expand by heat, and accordingly their size may change. Also, when the flat panel display vibrates, the electrode layers 25 may also vibrate. In these cases, the change in size or the vibration of the electrode layers 25 can be absorbed by the spaces between the electrode layers 25. Therefore, the shift of the electrode layers 25 against the cathode 3 can be prevented.

The electron-passing holes 6 are formed at predetermined positions of the gate electrode substrates 11. The electron-passing holes 6 are formed at the predetermined positions of the gate electrode substrates 11 by using a carbon dioxide gas laser, or by sandblasting, laminated printing, or the like. For example, assume that the electron-passing holes 6 have circular shapes each having a diameter of 0.2 mm to 0.4 mm. The number of electrons contributing to light emission, among electrons emitted from the electron-emitting sources 14, can be adjusted by adjusting the diameters of the electron-passing holes 6.

The notches 35 are formed at regions to be arranged on the cathode substrates 12. The notches 35 may include regions to be arranged on the substrate ribs 2. The notches 35 are formed at predetermined positions of the gate electrode substrates 11 by using a carbon dioxide gas laser, or by sandblasting, laminated printing, or the like.

For example, the notches 35 are formed, on the cathode substrates 12 including the substrate ribs 2 of the gate electrode substrates 11, to be axi-symmetrical with respect to the center line in the longitudinal direction of the band-like electrode layers 25. In place of the notches 35, the opening portions 26 may be formed of open holes. The notches 35 are formed at the predetermined positions of the gate electrode substrates 11 by using a carbon dioxide gas laser, or by sandblasting, laminated printing, or the like.

For example, as shown in FIG. 12A, the opening portions 26 are formed on the cathode substrates 12, including the substrate ribs 2, of the gate electrode substrates 11 to be substantially perpendicular to the band-like electrode layers 25. The notches 35 described above and the opening portions 26 may be mixed. In this case, the notches 35 and opening portions 26 are formed at predetermined positions of the gate electrode substrates 11 by using a carbon dioxide gas laser, or by sandblasting, laminated printing, or the like.

The front ribs 7 are formed on one major surface of the front glass plate 10. For example, an insulating paste containing low-melting frit glass is repeatedly screen-printed on the front glass plate 10 to reach a predetermined height, and is then calcined, thus forming the front ribs 7.

The front ribs 7 are formed such that their widths are 50 µm and that the gap between those surfaces of the gate electrode substrates 11 where the electrode layers 25 are formed and the metal-backed film 8 is 2.0 mm to 4.0 mm.

The gap between the front ribs 7 is set such that the phosphor screen 9 to be arranged at the region sandwiched by the front ribs 7 has a width of about 0.3 mm. The phosphor screen 9 is formed at that region on the front glass plate 10 which is sandwiched by the front ribs 7. For example, a phosphor screen made of a phosphor paste is screen-printed to form stripes, and is then calcined.

As the phosphor screen 9, the red-emitting phosphor screen 9R, green-emitting phosphor screen 9G, and blue-emitting phosphor screen 9B are used, such that each film has a thickness of 10 µm to 100 µm and a width of 0.3 mm. One type of phosphor screen 9 may be used for monochrome display.

An aluminum thin film with a thickness of about 0.1 µm is formed on the formed phosphor screen 9. For example, the aluminum thin film is formed by employing known vapor deposition. The gap between the front ribs 7 can be changed when necessary as far as dielectric breakdown does not occur between the front ribs 7 and the adjacent metal-backed film 8 or between the panel plate and the gate electrode substrates 11 and the front ribs 7 can sufficiently support the atmospheric pressure.

A flat panel display is assembled using the substrate, the gate electrode substrates 11, and the panel plate manufactured in the above manner.

The gate electrode substrates 11 are placed on the glass substrate 1 having the cathode 3 such that the gate electrode substrates 11 face up. In this case, if the notches 35 as shown in FIGS. 11A, 13A, and 15A are formed in the gate electrode substrates 11, the gate electrode substrates 11 are supported on the respective substrate ribs 2 by those regions of the band-like electrode layers 25 which include the center lines in the longitudinal direction.

If the opening portions 26 as shown in FIGS. 12A and 14A are formed, the gate electrode substrates 11 are supported on the respective substrate ribs 2 at two points including their perimeters.

If the opening portions 26 are formed as shown in FIG. 16A to leave the gate electrode substrates 11 on the substrate ribs 2, the gate electrode substrates 11 are supported by the respective substrate ribs 2.

A spacer glass frame (not shown) is placed on the periphery of the glass substrate 1, and the panel plate formed of the front glass plate 10 having the phosphor screen 9, metal-backed film 8, and front ribs 7 is placed on the spacer glass frame.

At this time, the front glass plate 10 is arranged such that the end faces of the respective front ribs 7 come into contact with the respective regions sandwiched by the band-like electrode layers 25 formed on each insulating substrate 4. The glass substrate 1, front glass plate 10, and spacer glass frame are adhered and fixed with low-melting frit glass, thus forming a vacuum envelope.

An exhaust port formed in the spacer glass frame is connected to a vacuum pump, and the interior of the vacuum envelope is evacuated to a predetermined pressure. After that, the exhaust port is sealed.

According to this embodiment, when forming the substrate, the carbon tubes are exposed by irradiating the surfaces of the conductive films with a laser beam. Alternatively, the carbon tubes may be exposed not by laser beam irradiation but by selective dry etching using a plasma.

As the conductive paste containing the carbon nanotubes, a silver paste is used. Alternatively, another conductive paste may be used. For example, a conductive paste using particles made of a silver-copper alloy may be used. Alternatively, a conductive polymer may be used.

As the substrate for forming the vacuum envelope, the glass substrate is used. However, the substrate is not limited to the glass substrate, but an insulating substrate such as a ceramic substrate may be used.

Cases have been described wherein the notches 35 and opening portions 26 are formed in the gate electrode substrates 11 by using a carbon dioxide gas laser, or by sandblasting, laminated printing, or the like. Alternatively, a resist pattern may be formed on regions where no notches 35 or opening portions 26 will be formed, and may be etched, thus forming the notches 35 and opening portions 26.

According to the embodiments described above, the electron-emitting source formation regions are formed by forming openings in the cathode substrates, and electron-emitting sources are formed in the electron-emitting source formation regions. The electron-emitting source formation regions do not accordingly come into contact with the gate electrode substrates. During alignment, the surfaces of the electron-emitting sources and the lower surfaces of the gate electrode substrates do not rub against each other, so that damage to the surfaces of the electron-emitting sources can be prevented. Therefore, the electron-emitting sources can uniformly emit electrons. As a result, the display uniformity within the panel can be improved.

When openings are formed in the cathode substrates and electron-emitting sources are formed in the openings, the electron-emitting sources can be made flat. Thus, the electron-emitting sources can uniformly emit electrons. As a result, the display uniformity within the panel can be improved.

As the cathode comes into contact with the insulating substrate of the gate electrode substrates at regions other than the regions where the openings are formed, the contact region of the cathode and gate electrode substrates can be limited.

As the gate electrode substrates have at least the notches and opening portions, the intersecting area in the gap sandwiched by the cathode and the gate electrodes of the gate electrode substrates can be decreased. Thus, the stray capacitance formed between the cathode and gate electrodes can be decreased, and the load capacitance generated during start-up can be decreased, so that the response speed of the circuit signal can be increased. As the variations in intersecting area also decrease, the response speed of each pixel can be made uniform. As a result, the display uniformity within the panel can be improved.

What is claimed is:

1. A flat panel display comprising: a vacuum envelope comprising a front glass plate which is at least partly transparent and a substrate opposing said front glass plate; a cathode formed on said substrate and having an electron-emitting source; a gate electrode substrate having an electron-passing hole and arranged in said vacuum envelope to oppose said substrate to be separate from said cathode; and a phosphor screen and anode electrode which are formed on a surface of said front glass plate in said vacuum envelope, wherein said gate electrode substrate comprises at least an insulating substrate having the electron-passing hole, and a gate electrode formed on said insulating substrate, wherein said gate electrode substrate further comprises an insulating layer formed on said gate electrode, and a field control electrode formed on said insulating layer.

2. A display according to claim 1, wherein said cathode comprises a plurality of band-like cathodes arranged parallel to each other, and electron-emitting sources formed on said band-like cathodes, said gate electrode is formed on said insulating substrate in a direction perpendicular to said band-like cathodes, and said phosphor screen is formed to have a band-like shape to correspond to said gate electrode.

3. A display according to claim 1, wherein said field control electrode covers at least said insulating layer selectively.

4. A display according to claim 1, wherein said field control electrode forms a mesh.

5. A display according to claim 1, further comprising: first driving means for applying a voltage to said anode electrode; second driving means for applying a cathode driving voltage to a cathode; third driving means for supplying a field control electrode driving voltage to said field control electrode; fourth driving means for applying a gate electrode driving voltage, which forms a predetermined potential with respect to said cathode, to said gate electrode; and control means for causing said second driving means to sequentially scan said cathode and, when said second driving means selects said cathode, driving said fourth driving means to apply, in accordance with an image to be displayed, a voltage which is positive with respect to said cathode to said corresponding gate electrode.

6. A driving circuit for a flat panel display according to claim 5, wherein said third driving means applies the voltage to said field control electrode such that a potential difference between said field control electrode and said cathode is smaller than a potential difference that generates an electric field for causing said electron-emitting source to emit electrons.

* * * * *